(12) United States Patent
Daniel et al.

(10) Patent No.: US 10,686,738 B2
(45) Date of Patent: Jun. 16, 2020

(54) PROVIDING PERSONAL ASSISTANT SERVICE VIA MESSAGING

(71) Applicant: Facebook, Inc., Menlo Park, CA (US)

(72) Inventors: Robert Franklin Daniel, Redwood City, CA (US); Yoram Talmor, Cupertino, CA (US); Alexandre Lebrun, Palo Alto, CA (US); Laurent Nicolas Landowski, Berkeley, CA (US); Deniz Demir, Sunnyvale, CA (US); Jeremy Harrison Goldberg, San Francisco, CA (US); Willy Blandin, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 413 days.

(21) Appl. No.: 14/809,078

(22) Filed: Jul. 24, 2015

(65) Prior Publication Data

US 2017/0026318 A1   Jan. 26, 2017

(51) Int. Cl.
*H04L 12/58* (2006.01)

(52) U.S. Cl.
CPC ............ *H04L 51/046* (2013.01); *H04L 51/32* (2013.01)

(58) Field of Classification Search
CPC .................. H04L 51/046; H04L 51/32
See application file for complete search history.

(56) References Cited

U.S. PATENT DOCUMENTS

| | | |
|---|---|---|
| D450,059 S | 11/2001 | Itou |
| 7,343,561 B1 | 3/2008 | Stochosky et al. |
| D599,363 S | 9/2009 | Mays |
| D608,366 S | 1/2010 | Matas |
| 7,669,134 B1 | 2/2010 | Christie et al. |
| D625,325 S | 10/2010 | Vu et al. |
| D665,401 S | 8/2012 | Rai et al. |
| D670,725 S | 11/2012 | Mori et al. |
| D690,312 S | 9/2013 | Cherian et al. |
| D695,767 S | 12/2013 | Tagliabue et al. |
| D704,718 S | 5/2014 | Kim et al. |
| D704,719 S | 5/2014 | Kim et al. |
| D705,237 S | 5/2014 | Kim et al. |
| D712,918 S | 9/2014 | Frick et al. |

(Continued)

FOREIGN PATENT DOCUMENTS

| | | |
|---|---|---|
| EP | 1677218 A2 | 7/2006 |
| EP | 2 821 943 A1 | 1/2015 |

(Continued)

OTHER PUBLICATIONS

Extended European Search Report issued in EP 16 156 333.3 dated Dec. 13, 2016.

(Continued)

*Primary Examiner* — Caroline H Jahnige

(74) *Attorney, Agent, or Firm* — Keller Jolley Preece

(57) ABSTRACT

The present disclosure relates to systems, methods, and devices for providing personal assistant service via messaging. In particular, one or more embodiments receive a request for personal assistant service in an electronic message from a user, assign the request to an agent, determine an intent of the request, and configure an agent user interface to include one or more options in accordance with the determined intent of the request.

20 Claims, 18 Drawing Sheets

(56) References Cited

U.S. PATENT DOCUMENTS

| | | |
|---|---|---|
| D716,332 S | 10/2014 | Chotin et al. |
| D729,263 S | 5/2015 | Ahn et al. |
| D733,166 S | 6/2015 | Lee |
| D736,247 S | 8/2015 | Chen et al. |
| D736,248 S | 8/2015 | Chen et al. |
| D738,888 S | 9/2015 | Lee |
| D742,894 S | 11/2015 | Foss et al. |
| D746,866 S | 1/2016 | Memoria et al. |
| D752,080 S | 3/2016 | Kim et al. |
| D760,275 S | 6/2016 | Zhang |
| D768,183 S | 10/2016 | Steplyk et al. |
| D771,080 S | 11/2016 | Kang |
| D781,328 S | 3/2017 | Fong et al. |
| D783,650 S | 4/2017 | Caporal et al. |
| D789,956 S | 6/2017 | Ortega et al. |
| D791,173 S | 7/2017 | Hart et al. |
| D791,174 S | 7/2017 | Hart et al. |
| 2003/0046273 A1 | 3/2003 | Deshpande |
| 2009/0058823 A1 | 3/2009 | Kocienda |
| 2009/0281967 A1* | 11/2009 | Jaffer ............... H04M 3/5191 706/11 |
| 2013/0040615 A1 | 2/2013 | Sawhney et al. |
| 2013/0185074 A1 | 7/2013 | Gruber et al. |
| 2013/0275164 A1* | 10/2013 | Gruber ................... G10L 17/22 705/5 |
| 2013/0275870 A1* | 10/2013 | Ferris ..................... G06F 8/60 715/708 |
| 2013/0311997 A1* | 11/2013 | Gruber ................... G06Q 10/10 718/102 |
| 2014/0055381 A1 | 2/2014 | Kim et al. |
| 2014/0075375 A1 | 3/2014 | Hwang et al. |
| 2014/0129651 A1 | 5/2014 | Gelfenbeyn et al. |
| 2014/0143684 A1 | 5/2014 | Oh et al. |
| 2014/0195252 A1 | 7/2014 | Gruber et al. |
| 2014/0280757 A1 | 9/2014 | Tran |
| 2014/0351350 A1 | 11/2014 | Lee et al. |
| 2015/0222584 A1 | 8/2015 | Holliday |
| 2016/0180257 A1* | 6/2016 | Rees ..................... G06Q 10/02 705/5 |
| 2016/0308799 A1* | 10/2016 | Schubert ............... H04L 51/046 |
| 2016/0358242 A1* | 12/2016 | Lagos ................ G06Q 30/0625 |
| 2016/0360039 A1* | 12/2016 | Sanghavi ............ H04M 3/5183 |
| 2016/0371749 A1 | 12/2016 | Liu et al. |

FOREIGN PATENT DOCUMENTS

| | | |
|---|---|---|
| JP | H 08274772 A | 10/1996 |
| JP | 2004-178527 A | 6/2004 |
| JP | 2013-517566 A | 5/2013 |
| JP | 2015-122104 A | 7/2015 |
| KR | 10-2013-0035983 | 4/2013 |
| KR | 10-2013-0124799 | 11/2013 |
| WO | WO 2014-113349 A1 | 7/2014 |
| WO | WO 2017-019110 | 2/2017 |

OTHER PUBLICATIONS

U.S. Appl. No. 29/550,163, Feb. 27, 2017, Office Action.
U.S. Appl. No. 29/550,163, filed Dec. 30, 2015, Daniel.
International Search Report and Written Opinion issued in PCTUS2015048653_04212016 dated Apr. 21, 2016.
U.S. Appl. No. 29/550,163, Aug. 28, 2017, Notice of Allowance.

* cited by examiner

PROVIDING PERSONAL ASSISTANT SERVICE VIA MESSAGING

BACKGROUND

1. Technical Field

One or more embodiments described herein relate generally to systems and methods for providing digital personal assistant service. More specifically, one or more embodiments relate to systems and methods of providing personal assistant service via a messaging application.

2. Background and Relevant Art

The increased availability and use of electronic devices has resulted in the availability of online access to a growing number of goods and services. Users of electronic devices can access information related to goods and services online via search engines, specializing services, or websites associated with businesses or other entities. In particular, mobile devices allow users to search for and find information related to a good or service at almost any time, such as while traveling and when the information is most relevant to the user.

Some conventional information service systems require users to manually search for information related to a good or service. Due to the sheer volume of goods and services available, however, finding information relevant to a particular query can sometimes be difficult. For example, conventional service information systems often require a user to search through pages of information that may be only tangentially related to the particular query.

Additionally, other conventional information service systems allow users to interact with artificial intelligence systems to obtain information related to goods and services. In particular, the conventional information service systems can train the artificial intelligence systems to respond to users' queries with relevant information. The artificial intelligence systems can also perform operations for the users in connection with the queries to reduce the amount of steps that the users must perform. While the artificial intelligence systems can often provide highly relevant and timely information to users, they have many limitations and often provide unrelated or unhelpful responses to user requests.

Accordingly, there are a number of disadvantages with conventional information service systems and methods.

SUMMARY

One or more embodiments described herein provide benefits and/or solve one or more of the foregoing or other problems in the art with systems and methods to provide personal assistant service via a messaging application. In particular, one or more embodiments improve the efficiency with which an agent is able to provide services to a user. For example, the systems and methods can improve how efficiency of the agent based on a determined intent of a request received from the user. Specifically, one or more embodiments determine the intent of the request in the electronic message using natural language processing. Thus, the systems and methods can identify the intent of the request to provide information to the agent in a way that reduces the amount of time and effort required for the agent to fulfill the request.

Additionally, to aid the agent in fulfilling the request, the systems and methods can provide the information to the agent in an agent user interface. For example, one or more embodiments configure the agent user interface to include one or more options in accordance with the determined intent of the request. By configuring the agent user interface to include options in accordance with the determined intent, the systems and methods can eliminate the number of steps that the agent has to perform to obtain enough information from the user to accurately and quickly fulfill the request.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
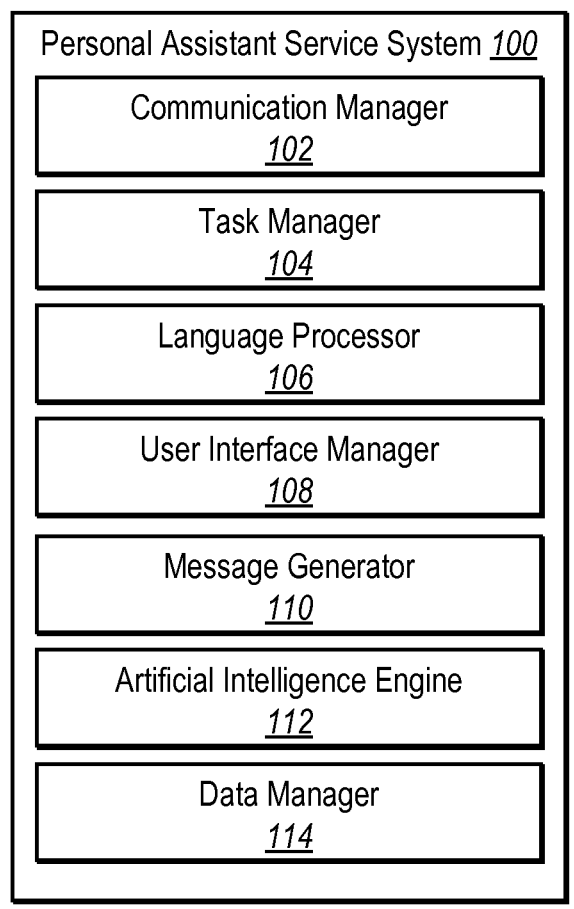
FIG. 1 illustrates a detailed schematic diagram of a personal assistant service system in accordance with one or more embodiments.

Embodiments of the present disclosure provide a personal assistant service system that improves the ability of an agent to fulfill a user request. In particular, one or more embodiments provide a personal assistant service system that determines an intent of the request and provides information to aid the agent in fulfilling the request. For example, the system can determine the intent of the request using a natural language processor. The system can then configure an agent user interface of an assigned agent to include information consistent with the determined intent. Configuring the agent user interface can include providing one or more options in the agent user interface to allow the agent to quickly select and provide relevant information or services to the requesting user within a messaging application.

As discussed in more detail below, the system receives an electronic message from a user of a messaging application with a request to assist the user in some way. In particular, the system can fulfill a request to perform one or more actions for the user or to provide the user with certain information. For example, the system can assign an agent to fulfill the request by interacting with the user to obtain the necessary information from the user in connection with the request.

In connection with assigning the agent to fulfill the user request, the system can also determine the intent of the request using natural language processing. Specifically, the system can use a natural language processor to determine the type of assistance that the user would like. For example, the natural language processor can identify words and/or phrases in the electronic message that indicate whether the user would like specific goods or services. The natural language processor can also identify other information related to the request that allows the system to accurately fulfill the request. One or more embodiments of the system allow the agent to make manual adjustments to the determined intent of the request.

After identifying the intent of the request, the system can provide information in the agent user interface to speed up the time in which the agent is able to fulfill the request. For example, the system can identify options associated with the determined intent of the request to reduce the amount of information that the agent has to find. In particular, the system can configure the agent user interface to include the identified options for use in exchanging messages with the user.

Additionally, the system can interact with third-party services to provide information the agent user interface. Specifically, the system can communicate with a third-party service based on the determined intent of the request to obtain information that can help the agent in fulfilling the user's request. For example, the system can send a request to the third-party service to view a listing of options based on the determined the intent of the user's request. After obtaining the listing of options from the third-party service, the system can provide the listing of options in the agent user interface so the agent can assist the user in selecting an appropriate option.

Additionally, the system can use information associated with the user request to train a machine-learning model for use with future requests. Specifically, the system can identify actions by the agent to determine whether a request was successful and to determine an accuracy of information that the system provided to the agent. For example, the system can determine how successfully the natural language processor determined the intent and whether information provided to the agent was accurate and/or helpful. By training the machine-learning model using information associated with user requests, the system can improve the accuracy of the natural language processor in determining the intent, as well as provide more helpful information to the agent in the agent user interface. Additionally, training the machine-learning model can allow the system to automate additional tasks associated with future user requests.

As used herein, the term "electronic message" refers to any form of electronic communication between two or more computing devices. Messages can include text messages, photos, stickers or other icons, videos, voice recordings, music, voice mails, etc. In one or more embodiments, a message is an instant message communicated in real-time or near real-time. In alternative embodiments, however, a message can refer to any from of electronic communication, such as an SMS message, an email, or a social network post or comment.

As used herein, the term "request" refers to content in a message associated with a query to provide information and/or perform one or more actions. In various examples, a request can include content in an electronic message with an indication to provide for a user with information and/or performing an action including, but not limited to, making a reservation, booking travel plans, purchasing an item, initiating a communication session with another user, answering a question about a given subject, playing a media content item, or tasks that a user may be able to perform over the Internet.

As used herein, the term "intent" with respect to a request in a message refers to the purpose of the request. For example, the intent of a request can include the requested action and the associated subject matter. Also as used herein, the term "personal assistant service" refers to a service by which an agent, or person assigned by the system, fulfills a user request in accordance with the determined intent of a request. For example, a personal assistant service can include a service by which an agent can fulfill a user request with the aid of an agent user interface and by exchanging instant messages with the user in a messaging application.

FIG. 1 illustrates a detailed schematic diagram of a personal assistant service system 100 (or simply "system"). The system 100 can include a plurality of components for implementing a personal assistant service. Specifically, as shown in FIG. 1, the system 100 can include a communication manager 102, a task manager 104, a language processor 106, a user interface manager 108, a message generator 110, an artificial intelligence engine 112, and a data manager 114. It will be recognized that although the components are shown to be separate in FIG. 1, any of the components may be combined into fewer components, such as into a single facility or module, or divided into more components as may serve a particular embodiment. Additionally, the components may implement the personal assistant service for a single application (e.g., a messaging application) or a plurality of applications.

The components can include software, hardware, or both. For example, the components can include computer instructions stored on a non-transitory computer-readable storage medium and executable by at least one processor of a computing device. When executed by the at least one processor, the computer-executable instructions can cause the computing device to perform the methods and processes described herein. Alternatively, the components can include hardware, such as a special purpose processing device to perform a certain function or group of functions. Additionally or alternatively, the components can include a combination of computer-executable instructions and hardware.

In one or more embodiments, the communication manager 102 can process messages received from users via a messaging application. For example, the communication manager 102 can act as a director for messages sent from a user within a messaging thread of a messaging application, identify a sender and a recipient of each message, and send the messages to the task manager 104 for assigning to an agent. Similarly, the communication manager 102 can also direct messages from an assigned agent to the user within the messaging thread by identifying that the messages are intended for the user. The communication manager 102 can direct messages from an agent to multiple computing devices associated with the user (i.e., each device upon which the user has installed a version of the messaging application).

As mentioned, the task manager 104 can assign tasks to agents of the system 100 to provide personal assistant service for users. In particular, the task manager 104 can receive messages from the communication manager 102 and assign messages to agents for completing requests in the messages. For example, the task manager 104 can manage a workload of a plurality of agents and assign tasks to agents based on the workloads of the agents. Additionally, or alternatively, the task manager 104 can assign tasks to agents based on locations of the agents, languages spoken by the agents, or other characteristics of the agents or users requesting assistance.

In one or more embodiments, the language processor 106 can determine the intent of requests. Specifically, the language processor 106 can analyze messages to determine the intent of a request based on text in one or more messages from a user. For example, the language processor 106 can use natural language processing techniques to parse text to identify words and phrases that indicate the type of request and purpose of the request. For example, the language processor 106 can determine a broad category of a request, a narrow category of a request, specific details associated with a request, or other information associated with the request based on identified words and phrases in one or more messages.

According to one or more embodiments, the user interface manager 108 can manage agent user interfaces for a plurality of agents associated with the system 100. For example, the user interface manager 108 can provide content within the agent user interfaces to aid the agents in performing tasks associated with the personal assistant service. To illustrate, the user interface manager 108 can communicate with other components in the system 100 to provide information and visual elements consistent with a determined intent of a user request. Additionally, the user interface manager 108 can display the agent user interfaces within agent-specific versions of a messaging application.

The system 100 can also include a message generator 110 to facilitate automatic generation of messages to provide to agents in connection with user requests. Specifically, the message generator 110 can use characteristics of a determined intent of a user request to generate messages for sending to the user without requiring the corresponding agent to type or otherwise input the message. For example, based on the determined intent and other information associated with the request, the message generator 110 can determine that the agent needs one or more additional details from the user to accurately fulfill the request and automatically generate a message to send to the user for the one or more additional details.

Additionally, the system 100 can include an artificial intelligence engine 112 (or "AI engine") to train and implement a machine-learning model in accordance with the personal assistant service. For example, the AI engine 112 can communicate with other components in the system 100 to identify information associated with a request. In particular, the AI engine 112 can obtain text from a message containing a request by a user, a determined intent for the request, actions by the agent, additional communications between the agent and the user, and an outcome of the request. The AI engine 112 can use the identified information to train the machine-learning model, which can improve future determinations of intent, as well as increasing the ability of the system 100 to fulfill user requests and reduce the workload of agents.

In one or more embodiments, a data manager 114 can facilitate data management and storage for use by components of the system 100. Specifically, the data manager 114 can store user information, language dictionaries, possible request intent information, action information, and other information that allows the system 100 to aid agents in fulfilling user requests. The data manager 114 can also maintain data associated with facilitating communications between servers, agent client devices, and user client devices. Additionally, the data manager 114 can maintain information associated with the system 100 across any number of devices. For example, the data manager 114 can store information on a single storage device or on a plurality of distributed devices (e.g., a cloud storage system or a network of servers).

Figure 2:
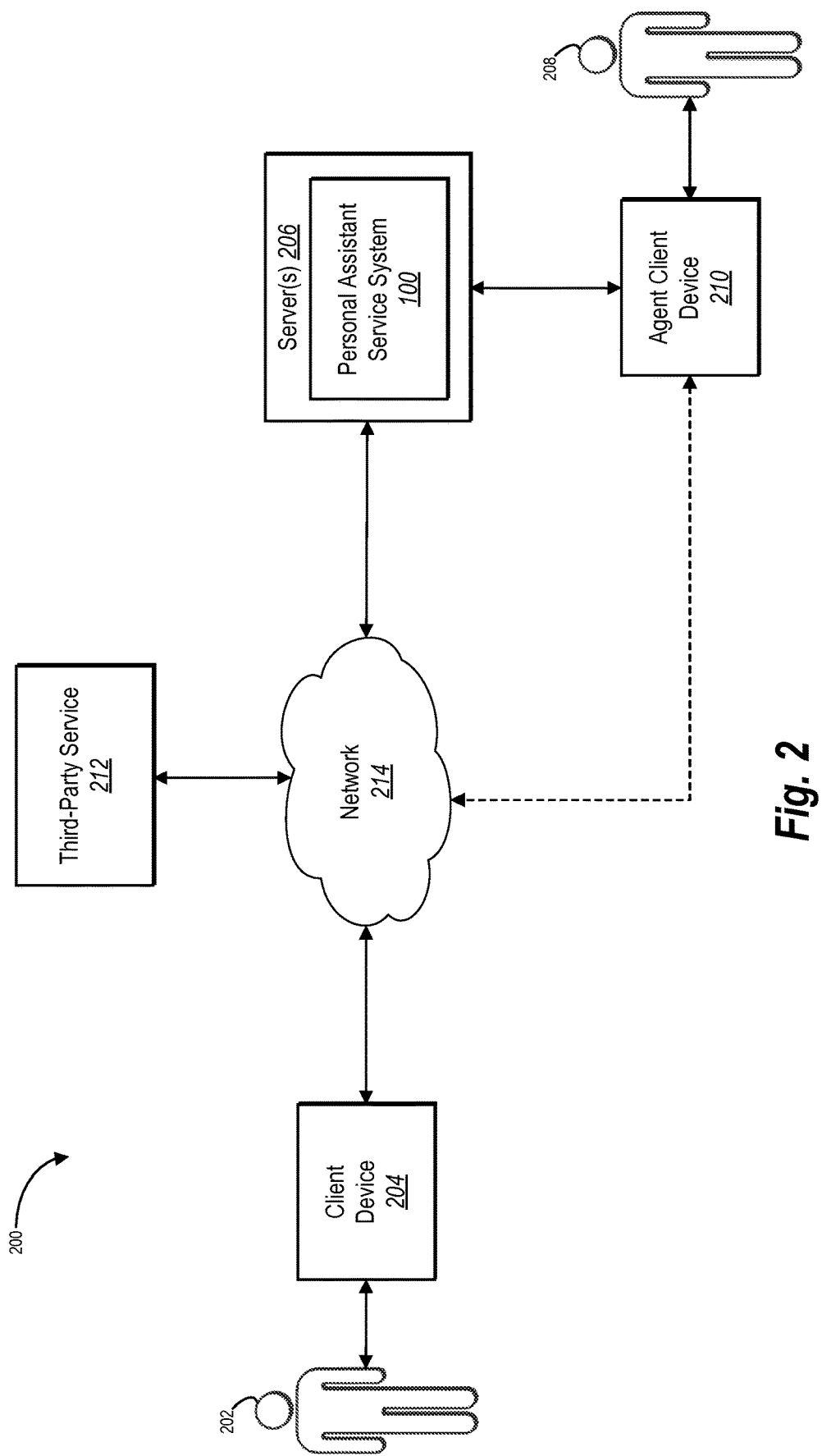
FIG. 2 illustrates a schematic diagram of a messaging system in which the personal assistant service system of FIG. 1 operates in accordance with one or more embodiments.

FIG. 2 illustrates a schematic diagram of a messaging system 200 in which the personal assistant service system 100 of FIG. 1 operates. As illustrated in FIG. 2, the messaging system 200 can include a plurality of devices or components communicating with each other in accordance with a messaging application. Specifically, the messaging system 200 can include a user 202 operating a client device 204, server(s) 206 including the personal assistant service system 100, an agent 208 operating an agent client device 210, and a third-party service 212. Although not shown, the messaging system 200 may include any number of users and corresponding client devices. Additionally, each of the devices or components in the messaging system 200 can communicate with each other via a network 214.

Although FIG. 2 illustrates a particular arrangement of the client device 204, the server(s) 206, the agent client device 210, the third-party system, and the network 214, various alternative arrangements are possible. For example, FIG. 2 shows the agent client device 210 in direct communication with the server(s) 206. In alternative embodiments, the agent client device 210 can communicate with the server(s) 206 by way of the network 214. Similarly, although FIG. 2 illustrates the third-party service and the client device 204 communicating with the server(s) 206 via the network 214, the third-party service and/or the client device 204 can communicate with the server(s) 206 directly.

As mentioned, the user 202 can use the client device 204 to communicate with an agent 208 using the agent client device 210. Specifically, the user 202 can communicate with the agent 208 by way of the server(s) 206. For example, the user 202 can compose and an electronic message containing a request to the agent 208 according to one or more messaging formats (e.g., in an instant message using a messaging application running on the client device 204). To illustrate, the client device 204 can send the electronic message containing the request to the server(s) 206 via the network 214. The server(s) 206 can determine that the electronic message is directed to the personal assistant service system 100 and send the electronic message to the assigned agent 208 at the agent client device 210.

Although the description associated with FIG. 2 relates to sending instant messages from the client device 204 to the agent client device 210 via the server(s) 206, the user 202 can send other types of electronic messages to and receive electronic messages from the agent 208. For example, the user 202 can send requests in a text message to the personal assistant service system 100 and communicate with the agent 208 via text messages. Likewise, the agent 208 can send messages to and receive messages from the user 202 using a messaging application on the agent client device 210.

Additionally, while FIG. 2 illustrates the user 202 and the agent 208 as people, the user 202 and/or the agent 208 may include other entities. For example, the user 202 can be a business with an account with the messaging system 200 or a social networking system. In another example, the agent 208 can also include artificial intelligence at the server(s) 206, such that the personal assistant service system 100 can fulfill simple requests without the use of a person agent and assign more difficult requests to the person agent. Additionally, artificial intelligence can aid a person agent in fulfilling requests by automatically determining an intent of a request, in addition to details associated with the request, as described in FIG. 1.

In one or more embodiments, the personal assistant service system 100 can also communicate with the third-party service to obtain information for fulfilling user requests. In particular, the system 100 can determine that a request in an electronic message is related to a particular service that the third-party service provides. The server(s) 206 can contact the third-party service to obtain information that may aid the agent 208 in fulfilling the user request.

Figure 6:
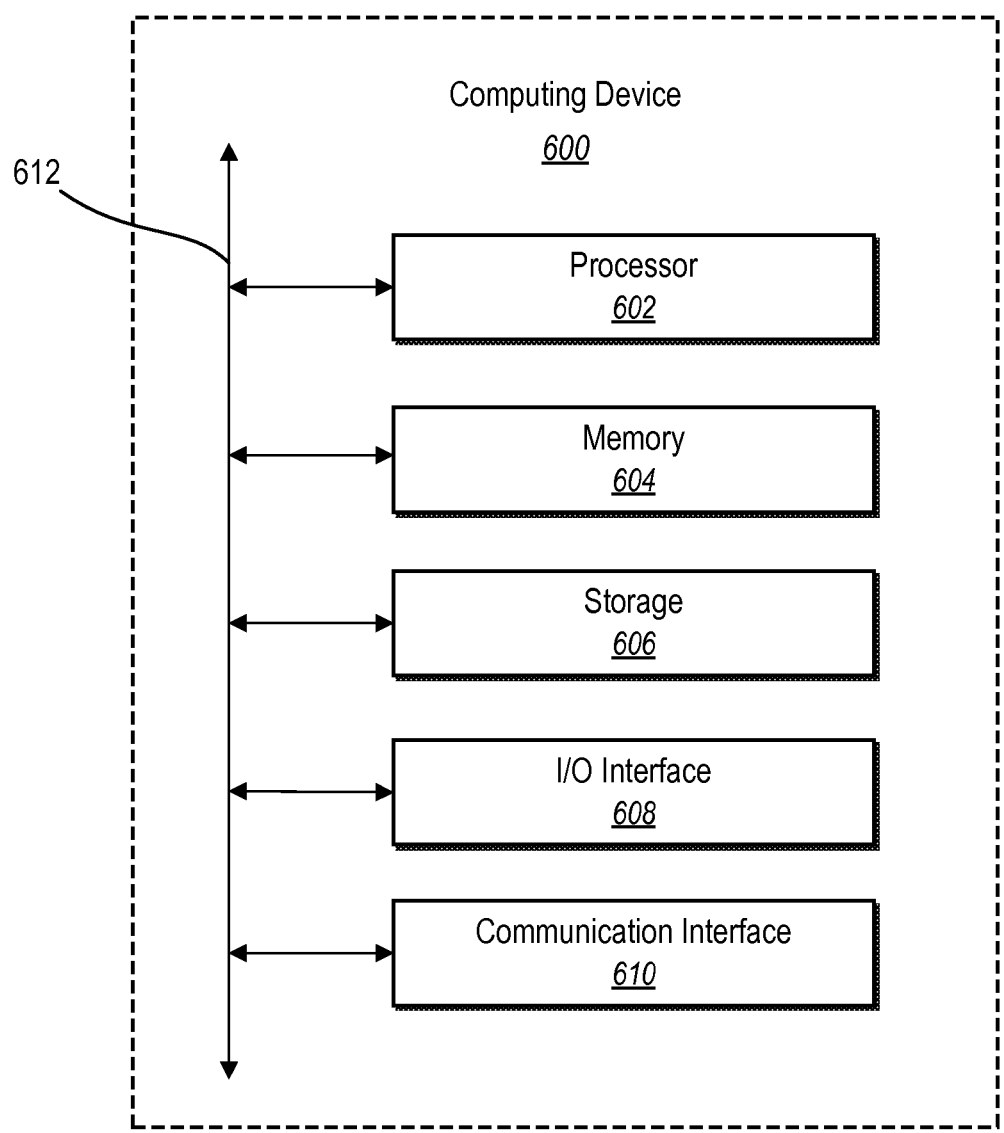
FIG. 6 illustrates a block diagram of an example computing device in accordance with one or more embodiments.

As FIG. 2 illustrates, the user 202 and the agent 208 can interact with the client device 204 and the agent client device 210, respectively. Examples of client devices include computing devices such as mobile devices (e.g., smartphones, tablets), laptops, desktops, or any other type of computing device. FIG. 6 and the corresponding description provide additional information regarding computing devices. Moreover, and as mentioned above, the client devices can communicate with each other and with the server(s) 206 through the network 214. In one or more embodiments, the network 214 includes the Internet or World Wide Web. The network 214, however, can include one or more private and/or public networks that use various communication technologies and protocols, as further described below with reference to FIG. 6.

As discussed, the systems and components discussed above with reference to FIGS. 1-2 can allow a messaging system 200 and a personal assistant service system 100 to fulfill requests by users in connection with a messaging system 200. Specifically, the messaging system 200 allows users to communicate with the personal assistant service system 100, and the personal assistant service system 100 can identify information associated with a request that allows an agent to fulfill the request accurately and efficiently. As described in more detail below, the components of the personal assistant service system 100 can provide, alone and/or in combination with the other components of the messaging system 200, one or more agent user interfaces. The components can allow agents to interact with a collection of display elements for a variety of purposes. In particular, FIGS. 3A-3I and the following description illustrate various example embodiments of agent user interfaces and features for implementing personal assistant service.

Figure 3A:
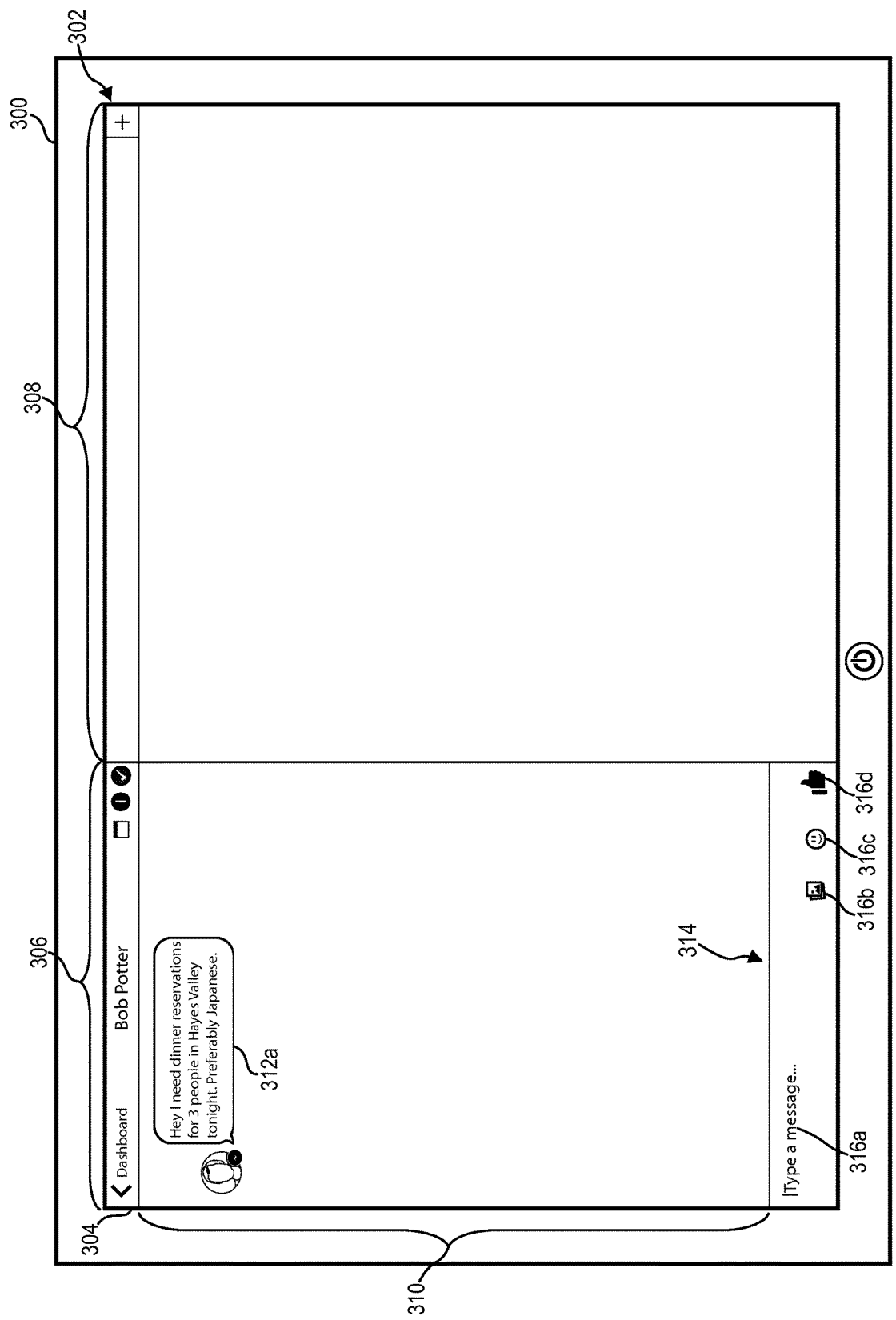
FIGS. 3A-3I illustrate example agent user interfaces in accordance with one or more embodiments.

For example, FIGS. 3A-3I illustrate various views of agent user interfaces provided in connection with a messaging application to facilitate electronic messaging and fulfillment of user requests. In some examples, an agent client device can implement at least some of the components of the messaging system 200 and the personal assistant service system, as described with reference to FIG. 1. For example, FIG. 3A illustrates an agent client device 300 with an agent user interface 302 for providing personal assistant service for users of the messaging system 200. To illustrate, in some embodiments, the agent client device 300 can implement at least some of the processes associated with the language processor 106, the user interface manager 108, the message generator 110, or the data manager 114.

Additionally, the agent client device 300 may be any client device that allows for the display of the agent user interface 302. FIGS. 3A-3I illustrate an agent client device 300 that includes a desktop computing device with a desktop monitor. The agent client device 300, however, can include any suitable computing device, such as, but not limited to, a tablet device, a handheld device (e.g., a smartphone), larger wireless devices, laptop or desktop computer, a personal-digital assistant device, or other suitable computing device can perform one or more of the processes and/or operations described herein.

As illustrated in FIG. 3A, the agent client device 300 includes a screen 304 for displaying or providing the agent user interface 302. Specifically, the agent client device 300 can run software designed to aid an agent in communicating with users and fulfilling user requests. For example, the agent client device 300 can run a version of a messaging application that is customized for agent use and also allows the agent to communicate with users that have a different user version of the messaging application. The messaging application running on the agent client device 300 can provide the agent user interface 302 that allows the agent to interact with a user via instant messages, while also providing information to the agent for use in fulfilling the user's request.

In one or more embodiments, the agent user interface 302 can include separate areas for exchanging messages with a user and retrieving information related to a request by the user. In particular, the agent user interface 302 can include a messaging interface 306 and a browser interface 308. For example, the agent user interface 302 can include the messaging interface 306 and a browser interface 308 in side-by-side positions within the messaging application, as illustrated in FIG. 3A. Alternatively, the agent user interface 302 can include the messaging interface 306 and the browser interface 308 in other positions within the messaging application, such as in separate windows, tabs, or otherwise. Additionally, or alternatively, the agent user interface 302 can include other areas or interfaces as may serve a particular embodiment.

As shown, the messaging interface 306 can include messages involving the user and the agent. For example, the messaging interface 306 can include a messaging thread 310 between the user and the agent, including a history of electronic messages exchanged between the user and the agent. To illustrate, as the user and the agent exchange instant messages, the messaging thread 310 can populate with the instant messages in a chronological order of when the user/agent sent the messages. The messaging interface 306 can also allow the agent to scroll through the messaging thread 310 if the messaging thread 310 does not all fit within the messaging interface 306.

The messaging system 200 can provide a variety of electronic communication characteristics to help a user distinguish between electronic communications in the messaging thread 310. For example, as illustrated in FIG. 3A, the messaging interface 306 displays the electronic messages (e.g., message 312a) received from an account of the user pointed toward one side (i.e., the left side) of the messaging interface 306. On the other hand, the messaging interface 306 can display the electronic messages (e.g., message 334a of FIG. 3D) sent from the agent pointed toward the opposite side (i.e., the right side) of the messaging interface 306. In one or more embodiments, the positioning and orientation of the electronic messages provides a clear indicator to the agent of the origin of the various electronic communications displayed within the messaging interface 306.

Another characteristic of the messaging interface 306 that helps the agent distinguish electronic communications may be a color of the electronic communications. For example, the messaging interface 306 displays sent electronic messages in a first color and received electronic messages in a second color. In one or more embodiments, the first and second colors may be black and white, respectively, with an inverted typeface color. In an alternative embodiment, the messaging interface 306 may display the electronic messages with white backgrounds and different colored outlines. In additional, or alternative, embodiments, the messaging interface 306 can display electronic messages with backgrounds of different patterns, in different fonts, in different sizes, or in any other manner that may distinguish the sent electronic messages from the received electronic messages.

The messaging interface 306 can also include a toolbar 314 to facilitate the input of content into an electronic message. Specifically, the toolbar 314 can include one or more selectable input controls that provide a user with various input options or other options. For example, the toolbar 314 can include a text input field 316a, a multimedia input control 316b, a symbol control 316c, and a like indicator control 316d. In one or more alternative embodiments, the toolbar 314 can provide the controls in a different order, may provide other controls not displayed, or may omit one or more of the controls of FIG. 3A.

The agent can interact with any of the controls to compose and send electronic communications. For example, if the agent interacts with the text input field 316a (e.g., by selecting the text input field 316a with a mouse cursor), the messaging interface 306 can provide a cursor indicating that the agent is able to type text into the field and allow the agent to input text. If the agent interacts with the multimedia input control 316b, the messaging interface 306 can allow the user to input various multimedia content items into an electronic message (e.g., digital photographs, digital videos). Similarly, if the agent interacts with the symbol control 316c, the messaging interface 306 can present a selection of symbols from which the agent can choose for entering into an electronic message. Likewise, selecting the like indicator control 316d can input a "like" icon within an electronic message.

In one or more embodiments, when the user begins typing within the text input field 316a of the messaging interface 306, the messaging interface 306 can display the corresponding characters in the text input field 316a. As illustrated in FIG. 3A, the agent exchanges messages with the user ("Bob Potter") participating in the conversation in the messaging thread 310. For example, as illustrated in more detail below, after the agent receives a message from the user, the agent can respond with a message by selecting the text input field 316a and entering text using a keyboard.

As mentioned previously, the personal assistant service system 100 can receive a message addressed to the system 100 with a request from a user. After receiving the message, the system 100 can assign the request to the agent based on the agent's workload or other criteria. In one example, the agents can view a queue of available requests and select a request from the queue. Assigning the request to the agent can cause the agent user interface 302 to display the message from the user within the messaging interface 306. To illustrate, the messaging interface 306 can display a new messaging thread 310 involving the user and the agent, and provide the first message from the user at the top of the messaging thread 310.

Figure 3B:
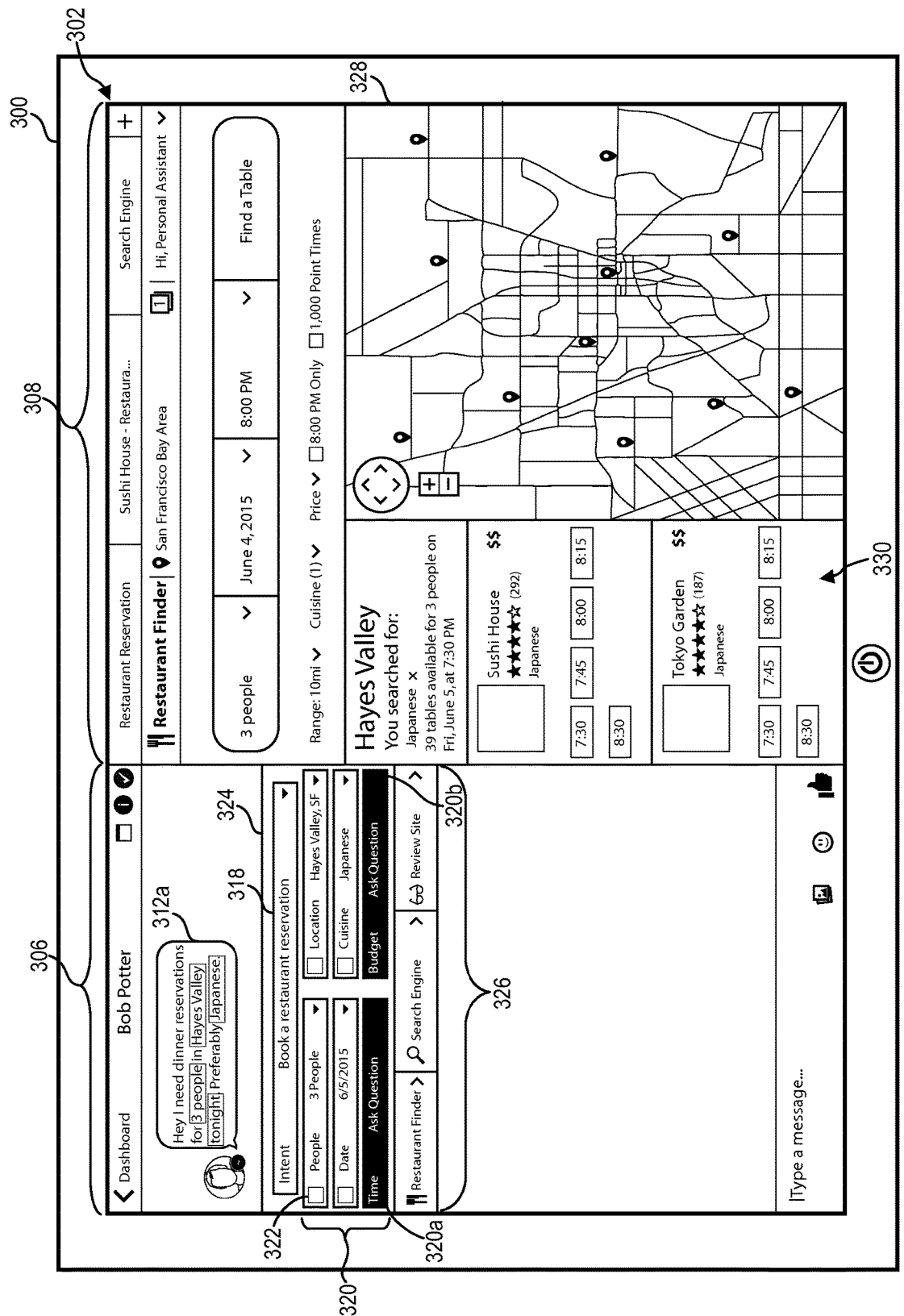

As mentioned, after receiving the message from the user, the system 100 can determine an intent of the request in the message. In particular, the system 100 can analyze the text of the message to identify keywords, phrases, numbers, or other information that indicates the intent of the request, including specific details about the request. For example, FIG. 3B illustrates the agent user interface 302 in which the system 100 has analyzed the electronic message 312b from the user and determined the intent of the request in the message. The agent user interface 302 can display the determined intent in an intent element 318. To illustrate, the system 100 can determine that the user wants to book a restaurant reservation.

After determining the intent of the message, the system 100 can provide one or more associated details to the agent based on the request. Specifically, the agent user interface 302 can display a plurality of detail elements 320 or populate a plurality of detail fields associated with details that the agent may need or that may be useful in accurately fulfill the request. For example, if the user is requesting restaurant reservations, the agent user interface 302 can display a plurality of detail elements 320 including details associated with a typical restaurant reservation booking. To illustrate, the agent user interface 302 can display detail elements 320 associated with the number of people, the date, the time, the location, the cuisine (i.e., type of restaurant), and the budget.

In one or more embodiments, the agent user interface 302 can display more or fewer detail elements 320 than shown in FIG. 3B. For example, the agent user interface 302 can display a number of detail elements 320 specifically associated with the determined intent. Each determined intent may be associated with a different number/type of details for the agent to accurately fulfill the corresponding request. To illustrate, if the request has a determined intent to book a flight, the agent user interface 302 can provide detail elements 320 for the number of people, a departure date, a return date, approximate times, the departure location, the arrival location, seat information, luggage information, etc.

In addition to presenting the detail elements 320, the agent user interface 302 can prepopulate one or more of the detail elements 320 with the corresponding details. For example, if the message includes details associated with the determined intent, the system 100 can analyze the text of the message to identify the details and the agent user interface 302 can then include the identified details in the corresponding detail elements 320. To illustrate, for booking a restaurant reservation, the system 100 can determine that the message includes information about the number of people, the location, the date, and the cuisine, and the agent user interface 302 can prepopulate the corresponding detail elements 320 with the identified details. If the system 100 cannot determine all of the required or pertinent details, the agent user interface 302 can leave one or more of the corresponding detail elements 320a, 320b unpopulated. Additionally, the agent can manually enter information for one or more of the unpopulated detail elements 320a, 320b.

The agent user interface 302 can also highlight information in the message for the agent to easily identify. For example, upon analyzing the message, the system 100 can identify the details corresponding to the determined intent within the message and highlight the words of phrases for the identified details. Additionally, the system 100 can color code the identified details in the message and apply the same color code to the corresponding detail elements 320, indicated by color coding boxes 322 next to the corresponding detail elements 320, so that the agent can easily identify which details the system 100 has automatically identified and prepopulated. Alternatively, the system 100 can apply other types of highlighting or notes to the message that allow the agent to quickly identify the details of the request, as may serve a particular embodiment. For example, the agent user interface 302 can use underlining, bolding, font changes, notes next to the message, other visual cues, audible cues, or other cues to inform the agent.

According to one or more embodiments, the agent user interface 302 can display the intent element 318 and detail elements 320 in an overlay 324 on top of the messaging interface 306. As the user and the agent interact, the overlay 324 can move within the messaging interface 306 so as not to cover any of the messages between the user and the agent. For example, if the user and/or the agent sends a message, the overlay 324 can reposition lower in the messaging interface 306 so that the overlay 324 is just below the most recent message in the messaging thread 310. Alternatively, the agent user interface 302 can display the intent element 318 and detail elements 320 within a separate area of the agent user interface 302, such as in the browser interface 308, in another interface, or in another window or tab.

In one or more embodiments, the agent user interface 302 can allow the agent to change the determined intent. For example, the agent may read the message with the request and determine that the automatically determined intent is incorrect. The agent can then select a new intent for the request by selecting the intent element 318 and choosing a new intent from a plurality of options (e.g., in a dropdown menu). The agent user interface 302 can display a plurality of predefined intent options that are related to the determined intent, for instance. In one or more implementations, the agent user interface 302 can provide a plurality of selectable elements for a determined intent to allow the agent to refine separate portions of the determined intent (e.g., to change "purchase jewelry" to "purchase necklaces").

Alternatively, the agent can manually enter the new intent, and the system 100 can determine that the manually entered intent corresponds to a particular intent that the system 100 recognizes. If the system 100 does not recognize the intent, the agent can perform the request without aid, and the system 100 can monitor the actions of the agent to train the artificial intelligence engine 112 to recognize the intent in future requests. Thus, the system 100 can learn from agents to be able to better identify future request intents.

If the agent modifies the intent of the request, the system 100 can adjust the detail elements 320 accordingly. Specifically, changing the intent can also result in different details that are required or helpful in accurately fulfill the request. For example, if the agent changes the intent to "Find a Japanese grocery store," the system 100 can present detail elements 320 corresponding to finding a specific grocery store. The system 100 can also analyze the message again to determine whether the message contains any of the corresponding details.

In addition, the system 100 can allow the agent to modify any of the detail elements 320 displayed in the agent user interface 302. For example, the agent can determine that one or more of the details that the system 100 automatically identified when analyzing the message are wrong. Accordingly, the agent can select the corresponding detail element (e.g., the number of people) and select a new detail for the request from a dropdown menu or other input method. Modifying one or more detail elements 320 can cause the system 100 to update information provided to the agent, such as the information provided within the browser interface 308 from a third-party service, as described below.

The agent user interface 302 can also display a plurality of third party elements 326 that allow the agent to select one or more third parties to search for information related to the request. In particular, the third party elements 326 can be associated with third-party services associated with the personal assistant service system 100. For example, the system 100 can enter into contracts with or otherwise be associated with third-party services that allow the system 100 to obtain information for aiding the agent in fulfilling user requests. To illustrate, FIG. 3B illustrates third party elements 326 corresponding to a restaurant finder, a search engine, and a review site.

In one or more embodiments, the system 100 can automatically contact one or more of the third-party services to obtain information about the determined intent. For example, given that the user request of FIG. 3B has a determined intent of booking a restaurant reservation for Japanese food, the system 100 can obtain information for Japanese restaurants close to the user's requested location that have reservation times at the requested time. As illustrated, the agent user interface 302 can display the information obtained from the third-party restaurant finder service within the browser interface 308. For example, the agent user interface 302 can display a map 328 with locations of Japanese restaurants in the area, along with a list 330 that includes additional details about each of the restaurants.

Additionally, or alternatively, the agent user interface 302 can allow the agent to switch between different third-party services within the browser interface 308. For example, if the agent wants to use a different third-party service to find information associated with the request, the agent can select one of the third-party services to view in the browser interface 308. To illustrate, the browser interface 308 can include tabs 332 associated with the third-party services. Additionally, the browser interface 308 can allow the user to view additional details about information from a third-party service, such as additional details about a particular restaurant.

In one or more embodiments, the agent user interface 302 can display information from the third-party service by displaying a webpage associated with the third-party service directly in the browser interface 308. For example, the system 100 can request the information from a URL of the webpage. Alternatively, the system 100 can make one or more calls to an application program interface (API) of the third-party service to obtain information from the third-party service, and then display the obtained information in a predetermined format within the browser interface 308. Additionally, the agent can interact with the information in the browser interface 308 to select and/or modify information from the third-party service. Thus, the system 100 can provide a display of information from the third-party service that can allow the agent to obtain the corresponding details to fulfill the request without requiring the agent to exit the messaging application.

As mentioned, the system 100 determines that one or more details corresponding to the determined intent may be missing from the message with the request. In response to identifying missing details, the agent user interface 302 can provide a prompt to the agent to ask a question about the missing details. For example, the agent user interface 302 can highlight the corresponding detail elements 320a, 320b with text that prompts the user to "Ask a question" about the corresponding details. If the request does not have any unpopulated detail elements, the agent can proceed with fulfilling the request.

Figure 3C:
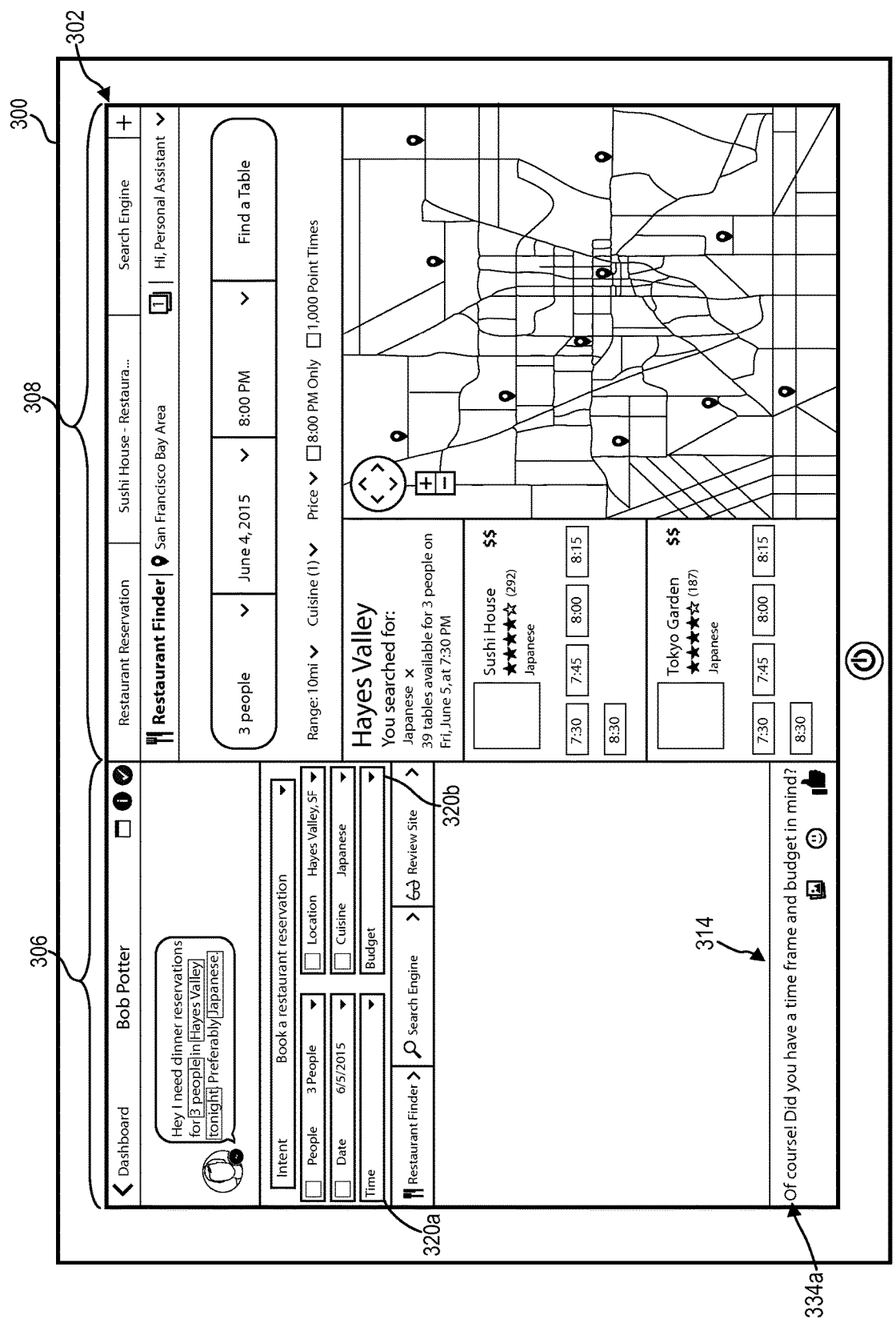

In response to the user selecting one or more of the unpopulated detail elements 320a, 320b, the system 100 can generate a message 334a to send to the user, as shown in FIG. 3C. Specifically, the system 100 can determine that the agent has selected a particular detail element and generate a generic message that asks the user for more information about the corresponding details. For example, if the agent selects a time element 320a and a budget element 320b, the system 100 can generate a message 334a that asks the user if the user has a time frame and budget in mind. Selecting the detail elements 320a, 320b can also cause the corresponding detail elements 320a, 320b to visually update to indicate that the detail elements 320a, 320b were selected.

Additionally, for each detail element that the agent selects, the system 100 can add the corresponding detail to the previously generated message 334a. For example, the system 100 can dynamically change the generated message 334a to include the details in a grammatically correct manner. Alternatively, selecting new detail elements 320 can cause the system 100 to generate a new message 334a that may have different text than the previously generated message 334a.

In one or more embodiments, the agent user interface 302 can display the automatically generated message 334a in the text input field 316a. In particular, the agent user interface 302 can provide the automatically generated message 334a to the agent to allow the agent to make any changes to the generated message 334a. For example, the agent user interface 302 can delete the message 334a, enter additional details into the message 334a, reword the message 334a, or otherwise modify the message 334a. To illustrate, the agent can enter examples or clarify any of the requested details in the generated message 334a. Providing an automatically generated message 334a asking for one or more details about the request can improve the efficiency of the agent.

Figure 3D:
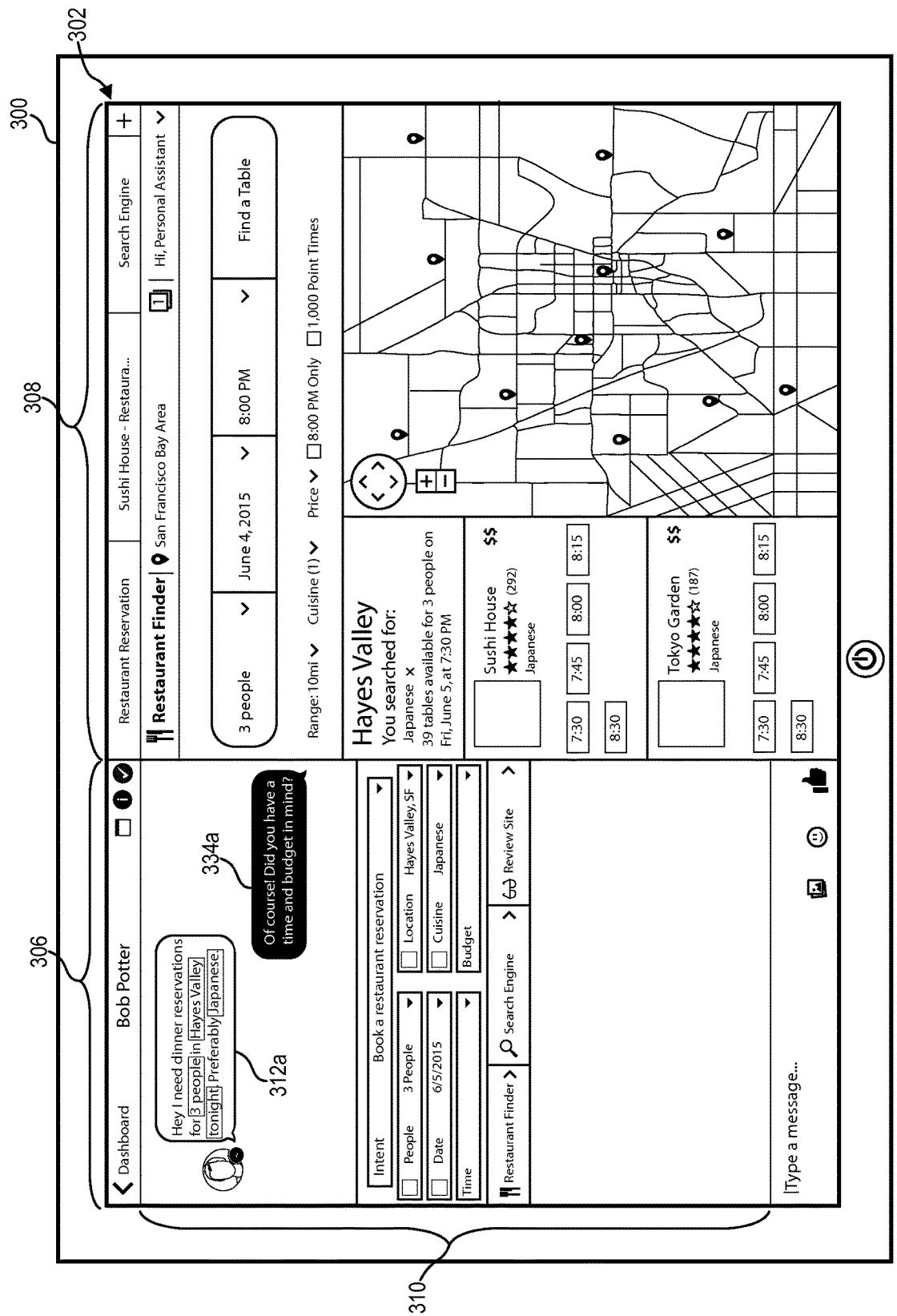

After verifying the generated message 334a, the agent can send the generated message 334a to the user. Sending the generated message 334a to the user causes the messaging thread 310 to update according to the chronological order of the messages between the user and the agent. FIG. 3D illustrates the agent user interface 302 including the generated message 334a within the messaging thread 310 between the user and the agent. As previously mentioned, messages from the agent to the user may be in a different position and/or may have a different appearance than messages from the user to the agent, allowing the user and the agent to easily distinguish the messages within the respective messaging applications.

Figure 3E:
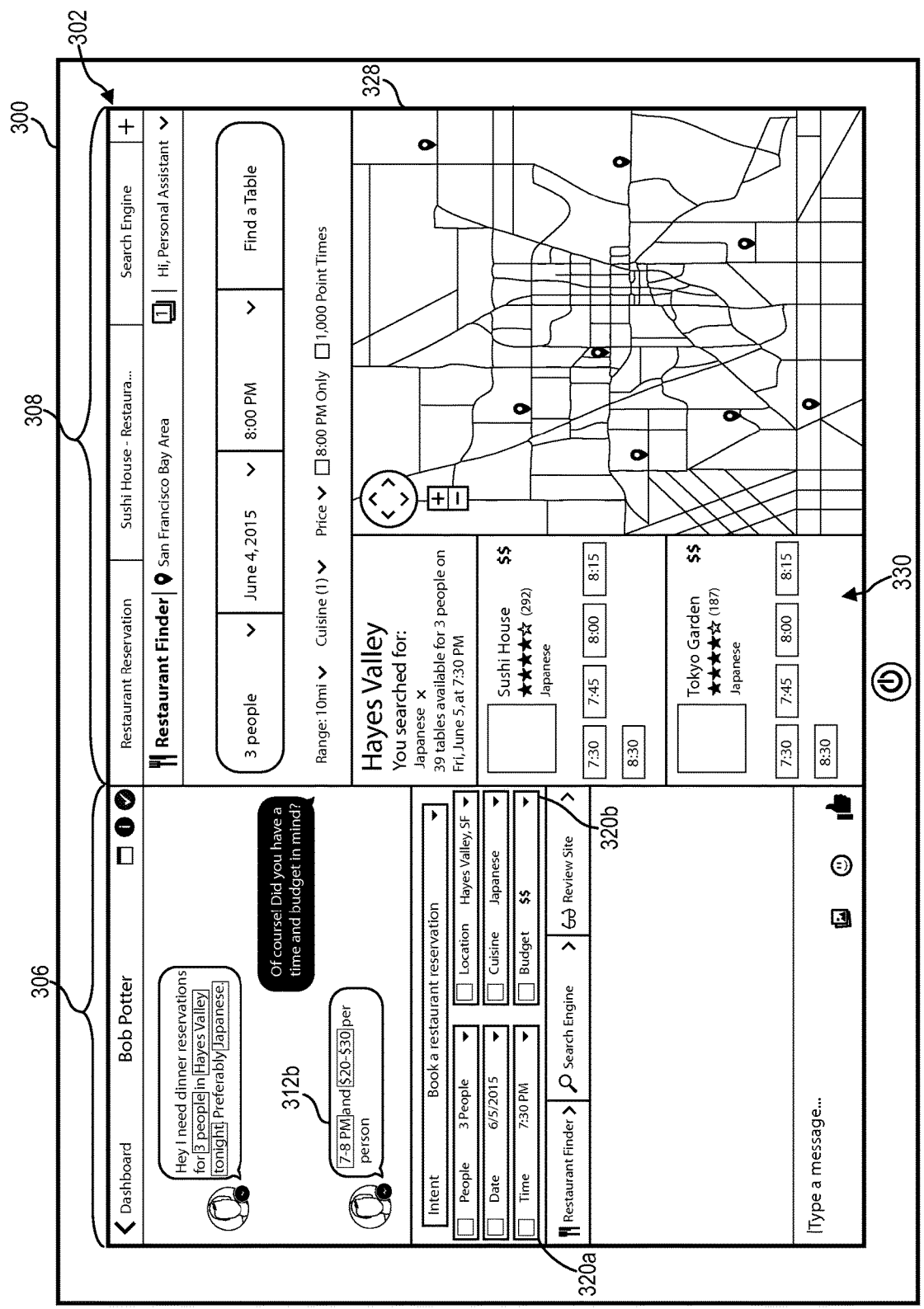

In response to the generated message 334a, the user can respond with one or more messages indicating the requested details. For example, FIG. 3E illustrates that the user has responded with a second message 312b indicating a time frame and a preferred budget. The system 100 can analyze the second message 312b to automatically identify the requested details. Additionally, the agent user interface 302 can populate the corresponding detail elements 320 with the requested details based on the second message 312b from the user.

In one or more embodiments, the agent user interface 302 can display one or more of the detail elements 320 with an estimate based on the information in the second message 312b from the user. For example, if the user provides a time range, the system 100 can determine that the corresponding time is in the middle of the time range, and the agent user interface 302 can display the estimated time in the time element. Alternatively, the system 100 can select a different time or provide the time range as the requested time.

Similarly, the system 100 can determine an estimated budget based on the second message 312b, and in accordance with a price system associated with the third-party service. To illustrate, the third-party service may use a cost system that identifies prices with a number of "$" icons indicating how expensive a given restaurant is (e.g., "$$" indicates moderate prices of dishes in the $20-30 range). The system 100 can automatically convert the identified detail to the price system corresponding to the third-party service and populate the budget element with the converted value.

In accordance with the received details, the system 100 can obtain new information from the third-party service. Specifically, the system 100 can update the request to the third-party service to include the additional details, which may help narrow the number of available options. For example, the system 100 can update the request for a reservation at a restaurant to include the budget and time details, possibly resulting in fewer available restaurants within the location associated with the request. The system 100 can update the browser interface 308 with the new information from the third-party service (e.g., by removing location markers from a map 328 and/or removing options from a list 330). Thus, the system 100 can improve the efficiency of the agent by automatically updating information displayed to the agent, and without requiring the agent to manually request the new information.

Figure 3F:
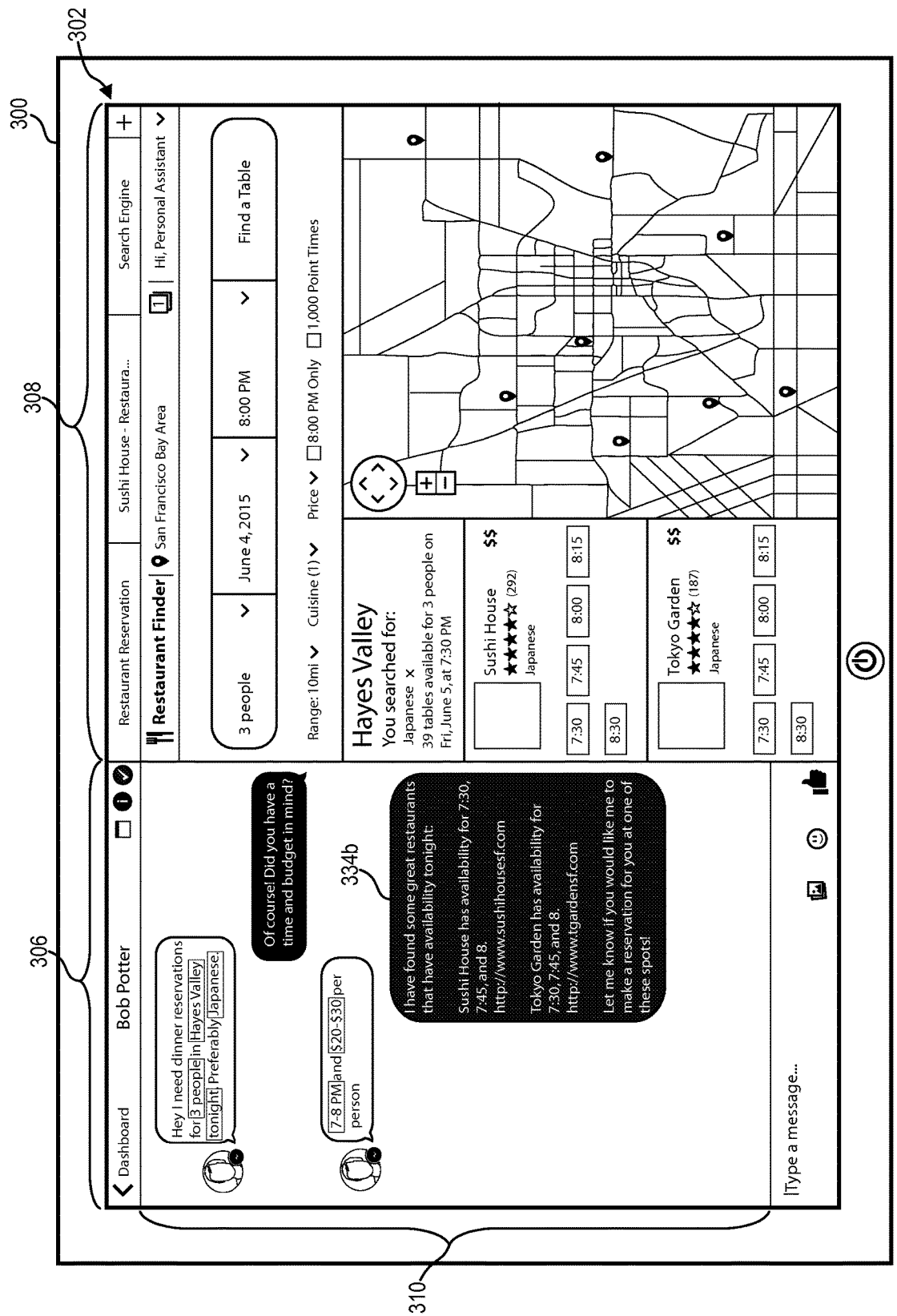

Once the agent has identified required or helpful details for fulfilling the request of the user, the agent can provide additional information to the user. Specifically, the agent can provide one or more options to the user to select. For example, the agent can send a second message 334b to the user in the messaging thread 310 indicating the one or more options available to the user. To illustrate, the message 334b can indicate one or more reservation times associated with one or more restaurants that meet the user's criteria. FIG. 3F illustrates the automatically generated message 334b including one or more options available to the user displayed in the messaging thread 310.

In one or more embodiments, the agent can manually generate the message 334b indicating the available options. Alternatively, the system 100 can automatically generate the message 334b indicating the available options based on information visible in the browser interface 308 or based on other information provided by the third-party service. For example, the system 100 can automatically generate the message 334b based on, but not limited to, the options with the highest reviews, the accuracy of a match of the options to the user's criteria, or options that the agent has marked for generating the message 334b. As with the generated message asking for additional detail, the agent can modify or review an automatically generated message 334b including available options prior to sending to the user.

Figure 3G:
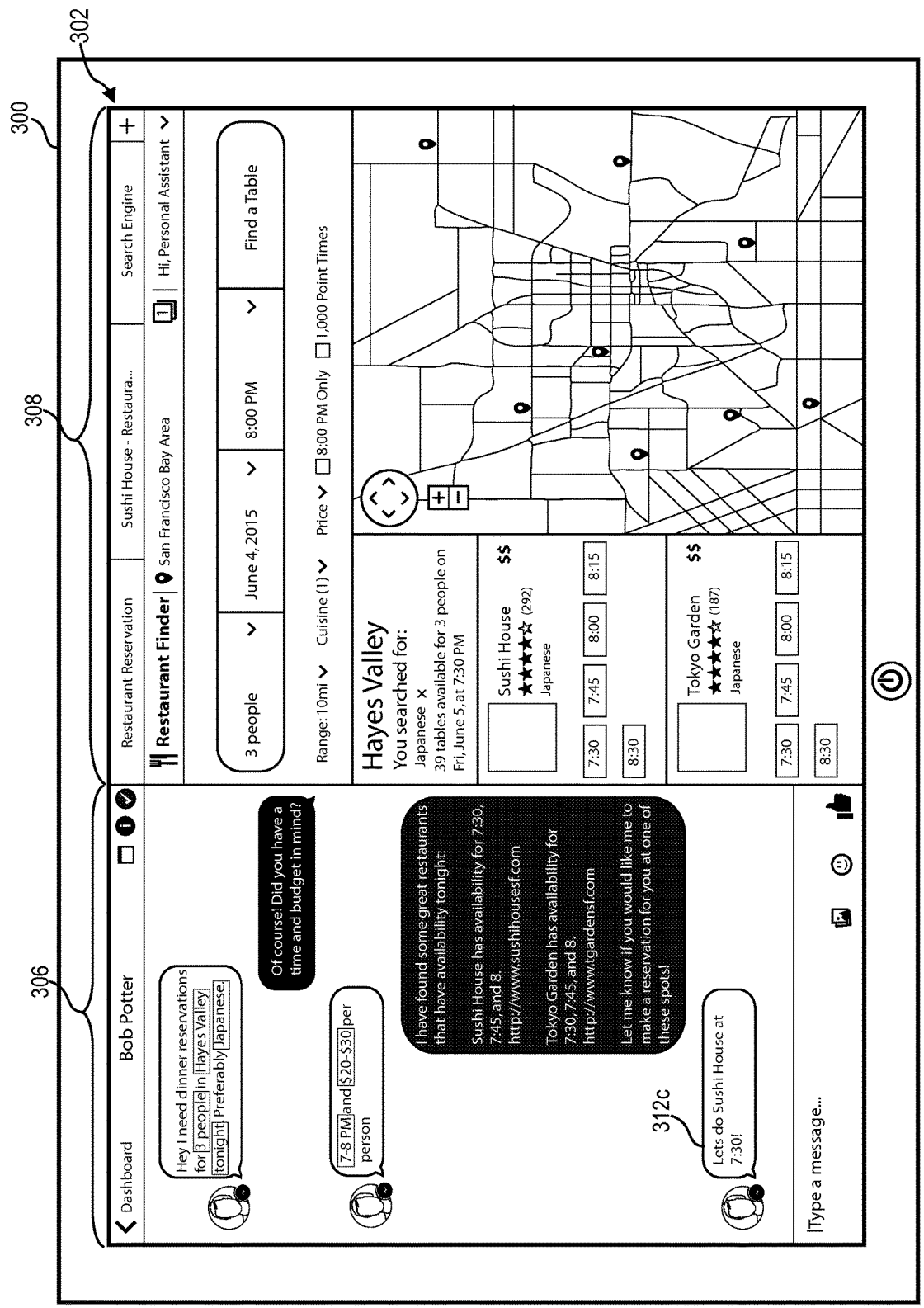

After sending the generated message 334b with the options to the user, the user can then reply with a message 312c indicating a selected option for fulfilling the request, as illustrated in FIG. 3G. In one or more embodiments, the system 100 can automatically fulfill the request based on the message 312c indicating the selected option by communicating with the third-party service and sending the required details. In alternative embodiments, the agent can manually fulfill the request by selecting the option selected by the user within the browser interface 308 and providing any required details to the third-party service. For example, the agent can verify that the system 100 has provided the correct details to the third-party service and choose the selected option within the browser interface 308.

In some alternative embodiments, certain requests from the user may not require the user to select an option, and the agent can fulfill the user's request without further communications from the user. For example, requests for information (e.g., the weather, movie times, media reviews or other general information) may not involve providing a selected option to a third-party service. Accordingly, the agent can simply obtain the requested information based on the details in the message(s) from the user (with the aid of the personal assistant service system 100) and provide the requested information to the user.

Figure 3H:
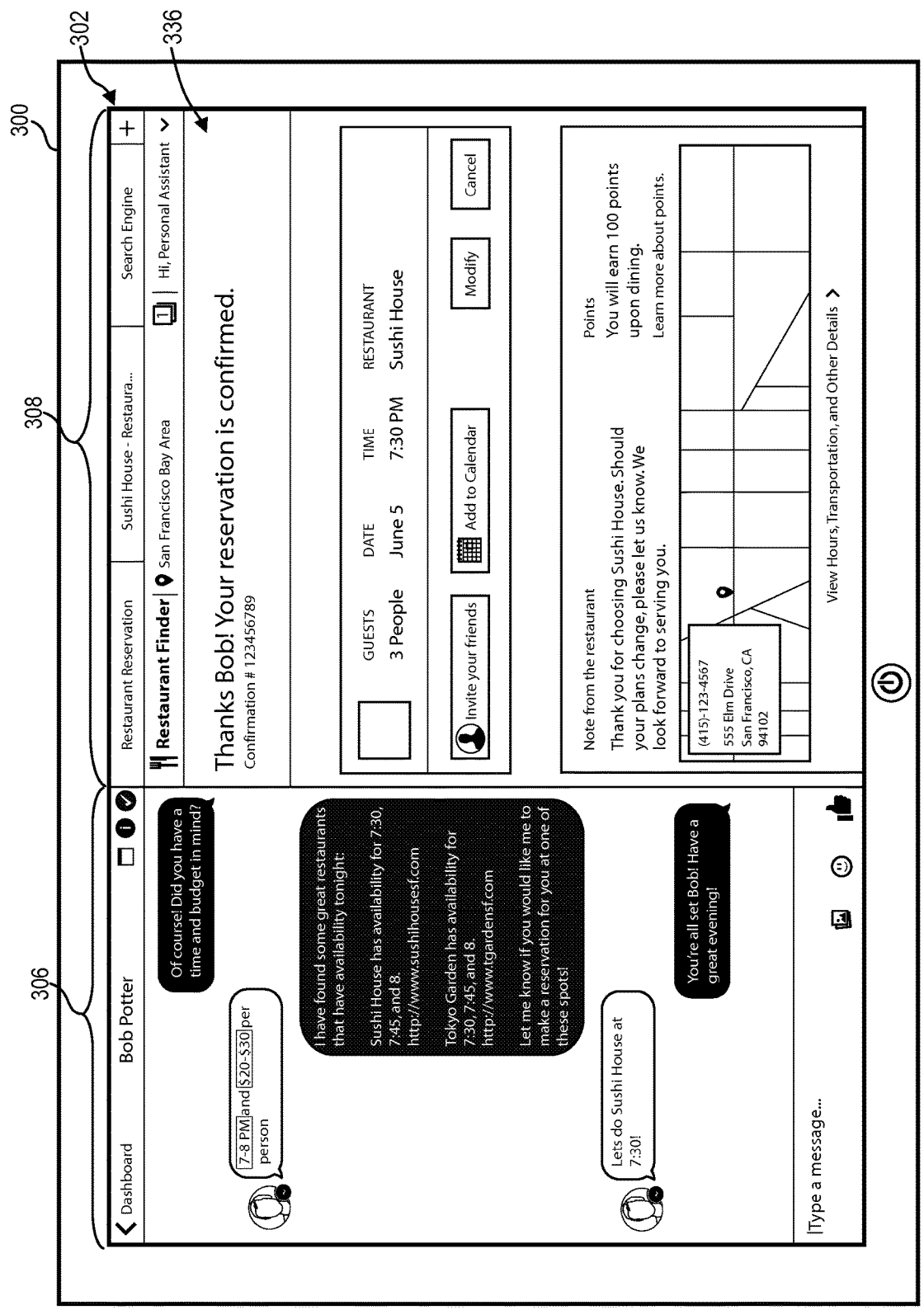

In one or more embodiments, after the agent or system 100 selects an option based on the messages exchanged between the user and the agent, the third-party service can provide a confirmation of the selection. For example, the third-party service can provide a confirmation page 336 to the agent within the browser interface 308 indicating that the agent successfully selected the option. To illustrate, as shown in FIG. 3H, the third-party service can provide a confirmation page 336 that indicates that the agent successfully scheduled a reservation at a restaurant. The confirmation page 336 can include the details for the reservation, such as the restaurant, the number of people, the date, and the time. The agent can modify the reservation if any of the details are incorrect.

According to at least some embodiments, the third-party service can allow the agent to fulfill the request in the user's name. For example, the system 100 can access account information for the user to provide to the third-party service in connection with the request. To illustrate, if the agent schedules a restaurant reservation for the user, the system 100 can provide the user's account information to the third-party service, such that the reservation is under the name of the user. Alternatively, the agent can manually provide the user's information to the third-party service by accessing the user's account information and scheduling the reservation using the user's account information. The system 100 can also provide information (e.g., frequent requests, preferences, writing styles) for storing with the user account to improve the ability of the system 100 to respond to future requests from the user.

In one or more embodiments, the system 100 can use the user account information in determining an intent and/or in fulfilling a request. For example, the system 100 can identify that a name listed in the user's message is related to the user based on the user account information. The system 100 can then leverage that information to refine the determined intent and/or to identify one or more details associated with the request. In one example, the system 100 can identify a pronoun in a request (e.g., "send flowers to my mom") based on the user account information and extrapolate the identity of the person based on the user's relationships. In one or more embodiments, the system 100 can use a social graph of a social networking system, as described in more detail below, to identify people in the user's request.

If the agent has access to the user's information and fulfills a request using the user's information, the agent may be able to perform additional actions for the user. For example, the agent may be able to add the reservation to a calendar associated with the user's account, such that the user may be able to view the reservation in the calendar. Additionally, the user may also be able to access the reservation to make modifications or view additional information without the aid of the agent.

In alternative embodiments, the third-party service can allow the agent to fulfill the request in the name of the personal assistant service. Specifically, rather than obtaining the user's account information and providing the user's account information to the third-party service, the system 100 can provide information for the personal assistant service to the third-party service. The agent can then indicate to the user that the fulfilled request (e.g., the reservation) is in the name of the personal assistant service. Thus, the agent may be able to fulfill the request without requiring the user to provide personal information to the third-party service.

For at least some requests, the third-party service may require the agent to enter into a payment transaction on behalf of the user. For example, if the user requests that the system 100 purchase an item for the user, the third-party service that provides the item may require the system 100 to provide a payment to the third-party service. According to one or more implementations, the system 100 can request that the user pay the system 100 first, and the system 100 can then pay the third-party service. In such embodiments, the third-party service will never have access to the user's financial information. Alternatively, the system 100 can provide the user's financial information to the third-party service to allow the user to enter into a direct payment transaction with the third-party service. In yet other embodiments, the system 100 can fulfill the request in the user's name, but provide payment information for the personal assistant service to the third-party service (i.e., the user pays the system 100 and the system 100 pays the third-party service, but the system 100 provides the user's name to the third-party service).

In one or more embodiments, the system 100 can receive compensation from a third-party service. For example, one or more third-party services may enter into agreements with the system 100 to provide compensation for recommending the third-party service to users. Additionally, one or more third-party services may provide commission if a request results in a payment transaction with the third-party service. Additionally, third-party services can pay the system 100 to provide advertisements in connection with the personal assistant service.

Figure 3I:
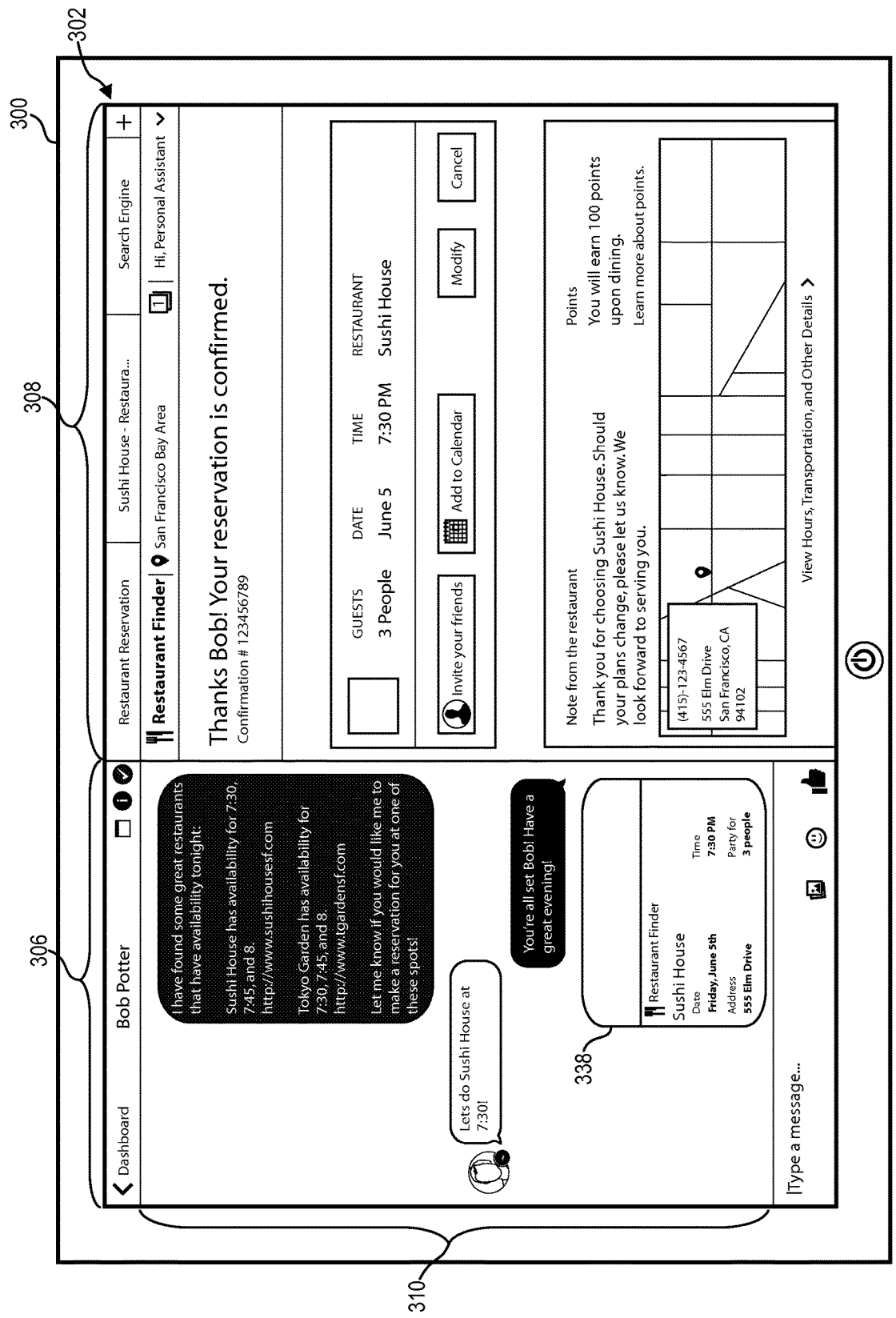

In one or more embodiments, the system 100 can provide a confirmation message 338 to send to the user in connection with the confirmation page 336. Specifically, the system 100 can generate a confirmation message 338 that includes details relevant to the fulfilled request. For example, the system 100 can obtain information associated with the fulfilled request from the third-party service (e.g. by scraping the webpage of the third-party service or by making a call to the API of the third-party service) and automatically generate the confirmation message 338 to include the obtained information. To illustrate, the system 100 can provide a confirmation message 338 within the messaging thread 310 between the user and the agent indicating the relevant details associated with the successful reservation (e.g., restaurant, date, time, address, and number of people). FIG. 3I illustrates a messaging thread 310 containing a confirmation message 338 for a successful reservation.

Alternatively, the system 100 can indicate to the user if the agent is unable to fulfill the request for any reason. For example, the system 100 can generate a message indicating that the agent was unable to fulfill the request, including a reason for the failure. To illustrate, if the agent is unable to contact the third-party service, the system 100 can generate a message to send to the user indicating that the third-party service is unavailable. Similarly, for a request involving a payment transaction, the system 100 can indicate to the user that the request could not be fulfilled if the third-party service rejected a payment credential of the user.

Figure 4A:
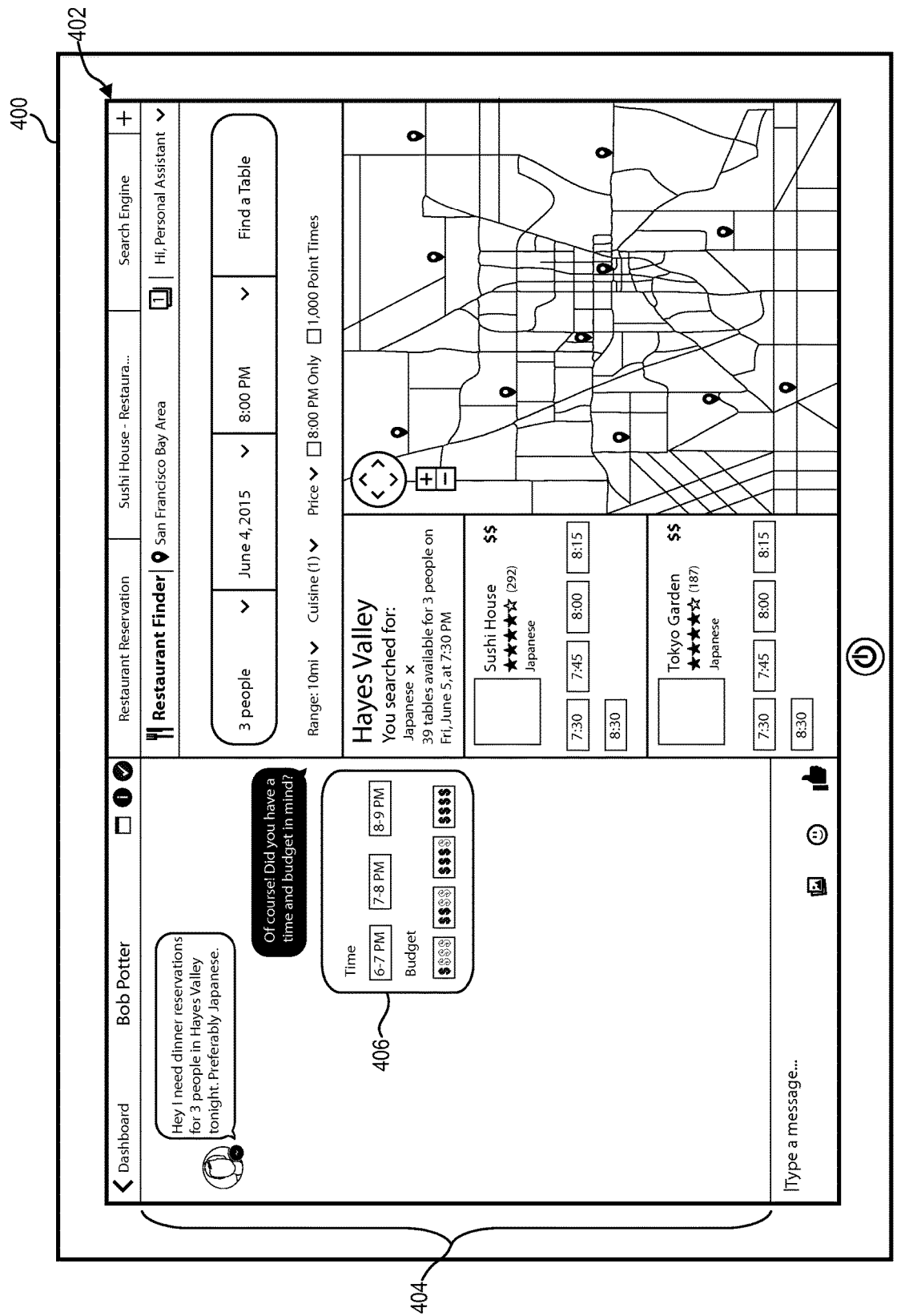
FIGS. 4A-4C illustrate example agent user interfaces in accordance with one or more embodiments.
Figure 4B:
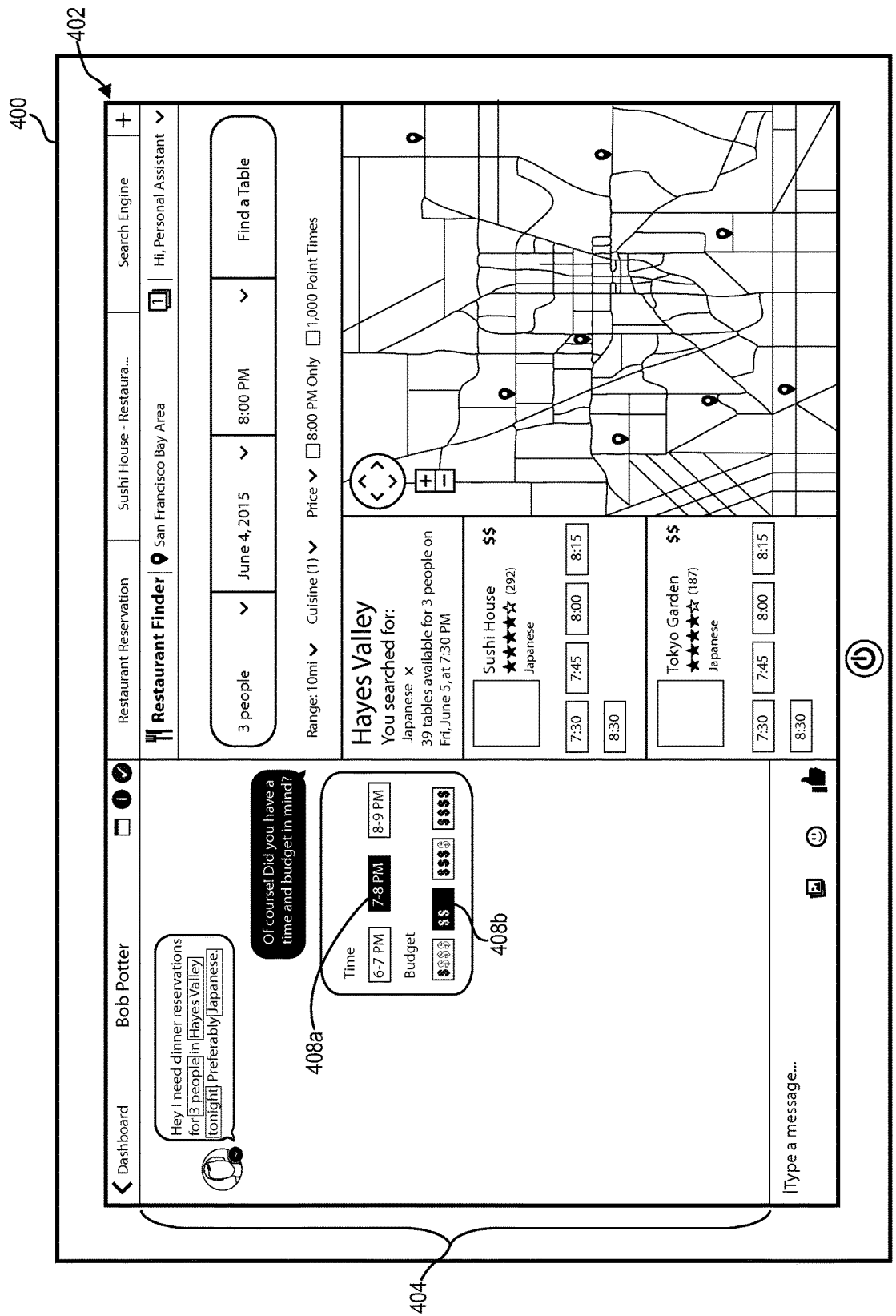
Figure 4C:
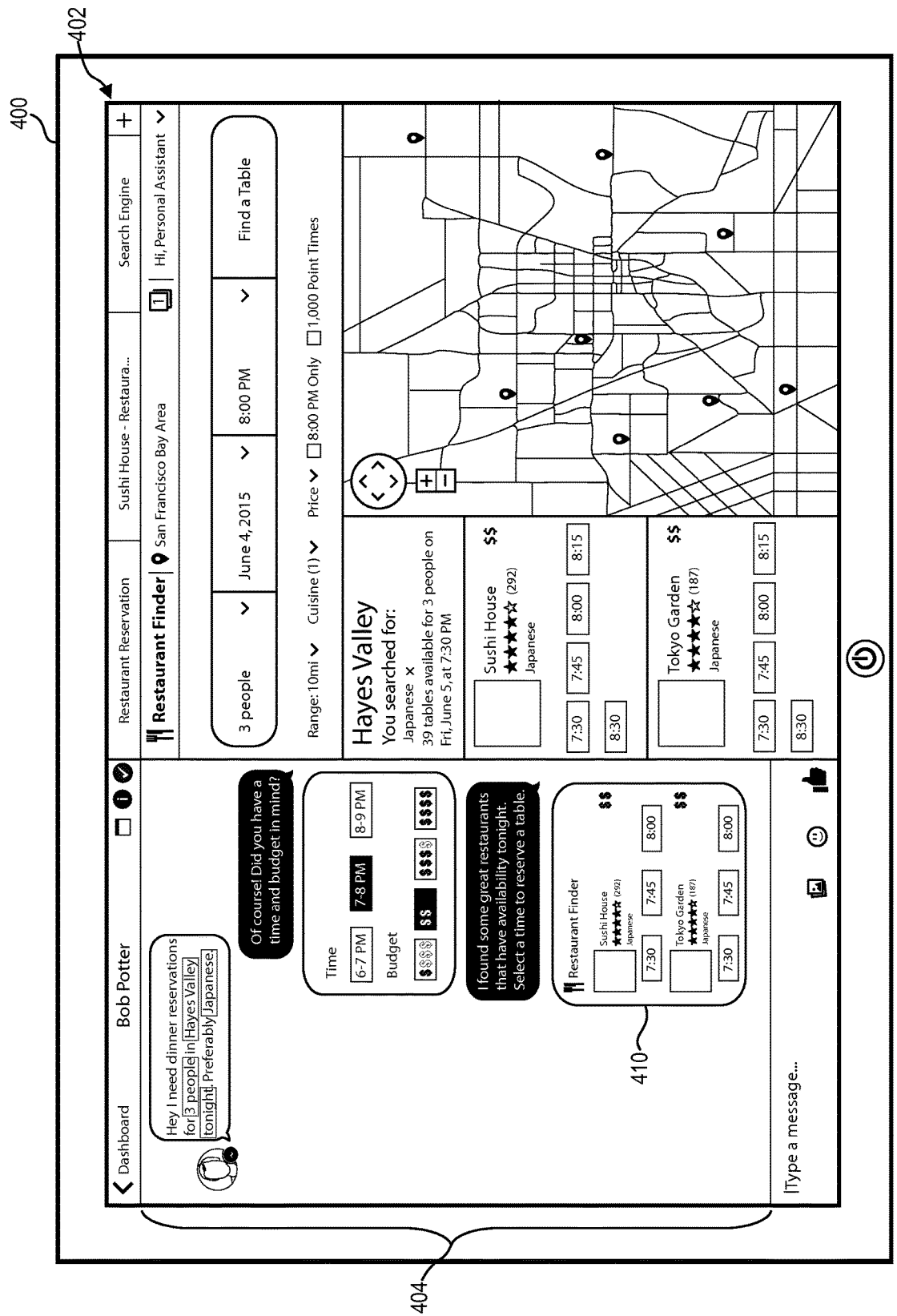

As previously mentioned, the system 100 can automatically generate messages to provide to the user within a messaging thread 310 between the user and the agent. Although FIGS. 3A-3I illustrate automatically generated messages including text, the system 100 can include other content in generated messages for the messaging thread 310. FIGS. 4A-4C illustrate embodiments of an agent client device 400 with an agent user interface 402 including alternative embodiments of automatically generated messages within a messaging thread 404.

In one or more embodiments, the system 100 can provide interactive messages within the messaging thread 404. Specifically, the agent user interface 402 of FIGS. 4A-4C includes interactive messages within the messaging thread 404. For example, the system 100 can generate the interactive messages and insert the interactive messages into the messaging thread 404 with or without input from the agent. To illustrate, after analyzing the message with the request from the user, the system 100 can identify one or more details associated with the determined intent and generate an interactive message with several different options from which the user can select. For example FIG. 4A illustrates a first interactive message 406 with a plurality of time frame options and a plurality of budget options.

The interactive messages allow the user to provide information to the system 100 without requiring the user to type a response to send to the agent. In particular, the user can interact with the first interactive message 406 in a messaging application at the client device by tapping on or otherwise selecting the desired option for the corresponding detail. For example, the user can select the "7-8 PM" time frame by tapping on the corresponding time frame option 408*a*, and the "$$" budget by tapping on the corresponding budget option 408*b*. Selecting an option can cause the client device to send the selection to the system 100, which updates the agent user interface 402 accordingly (e.g., by highlighting the selected options), as illustrated in FIG. 4B. Additionally, selecting an option can cause the system 100 to send the updated details to the third-party service.

In response to the user selecting one or more options in the first interactive message 406, the system 100 can provide one or more additional messages. For example, the system 100 can then provide an interactive message including the available options that meet the user-specified criteria. To illustrate, a second interactive message 410 of FIG. 4C includes a plurality of options for restaurant reservations. Specifically, the second interactive message 410 includes a first restaurant with a plurality of available reservation times and a second restaurant with a plurality of available reservation times. The user can select from the available options to instruct the system 100 to finalize the reservation and fulfill the request.

According to one or more embodiments the user can ask for additional options. For example, if the user is not satisfied with the provided options, the user can send a message to the system 100 indicating that the user would like to see one or more additional options. The system 100 can analyze the message to determine that the user would like more options. The system 100 (or the agent) can then request additional options from the third-party service and provide the additional options in a message to the user within the messaging thread 404.

In at least some embodiments, the user can cancel the request at any time after sending the original message with the request. For example, the user can send a message indicating that the user no longer wants the system 100 to fulfill the request (e.g., with a phrase such as "Never mind" or "cancel"), select a cancel element in the messaging application, or close the messaging thread 404. In response to determining that the user wants to cancel the request, the system 100 can close out the task for the agent and/or send a message to the user indicating that the request was canceled.

In one or more embodiments, providing interactive messages can allow the system 100 to reduce the amount of work that an agent performs in fulfilling requests. Specifically, the interactive messages can be part of further automation of the personal assistant service to fulfill requests using artificial intelligence instead of live agents. For example, as mentioned previously, the system 100 can train a machine-learning model using previous requests and interactions between users and agents to improve agent efficiency and reduce user wait time. As more users provide requests and interact with agents, the system 100 increases the dataset with which to train the machine-learning model. Additionally, increasing the dataset can improve the accuracy of the machine-learning model and increase the types of actions that the system 100 can perform without an agent. A well-trained machine-learning model can perform a variety of different actions—from simple to more complex—associated with fulfilling user requests.

According to at least some embodiments, the machine-learning model can train on the messaging histories and actions of all agents associated with the system 100. Specifically, the machine-learning model can learn from the actions take by agents in connection with user requests to know how to response to future similar requests. For example, the system 100 can store input and actions from an agent (e.g., operations that an agent performs and text that the agent inputs) to determine how to interpret certain phrases or terms and how to respond to the phrases and terms.

Additionally, the system 100 can learn from the writing styles of agents and users, including idioms, colloquialisms, alternative meanings to words, jokes, and other writing characteristics. Improving the variety of writing styles can help make the experience more enjoyable for the users and the agents. The system 100 can also maintain agent profiles so for storing recognized writing styles and mannerisms for use with the machine-learning model. For example, the system 100 can apply an agent's writing style to automatically generated messages for sending to a user in connection with a request.

In one or more embodiments, the system 100 can provide additional information and/or interfaces within the agent-specific messaging application. For example, the system 100 can provide a task list that allows the agent to view a list of tasks currently assigned to the user. Each task may be associated with a messaging thread 404 that the agent is able to select and view.

Additionally, each task may have associated time information determined by the initiation date of the request. For example, the task list can organize the tasks based on the chronological order in which the users submitted the corresponding requests. To illustrate, the system 100 can list the oldest tasks at the top of the task list. The task list can also display whether a given task is urgent and needs to be addressed immediately. For example, a request for a reservation for the same day may be urgent, while a request for a reservation for a day two weeks in advance may not be urgent.

The system 100 can also prompt the agent to follow up with a task based on the type of request. In particular, some user requests may involve purchasing or ordering a product or service for delivery to the user or performing a future action for the user (e.g., shipping a product to the user, holding a reservation, booking a flight). If the request involves a delivery or future action associated with the third-party service, the system 100 can prompt the agent to send a message to follow up with the user to verify that the third-party service fulfilled the request adequately. The system 100 can follow up more frequently for urgent tasks and/or move urgent tasks to the top of the task list.

After an agent has fulfilled a request, the agent can close the task. Specifically, the agent can move the corresponding task to a list of closed tasks. Closing a task can terminate the messaging thread 404 with the user so that the agent can no longer send messages to the user in the messaging thread 404. According to one or more embodiments, the system 100 can maintain a history of tasks for an agent, including the closed tasks.

FIGS. 1-4C, the corresponding text, and the examples, provide a number of different systems and devices for providing personal assistant service via messaging. In addition to the foregoing, embodiments can be described in terms of flowcharts comprising acts and steps in a method for accomplishing a particular result. For example, FIG. 4 illustrates a flowchart of exemplary methods in accordance with one or more embodiments.

Figure 5:
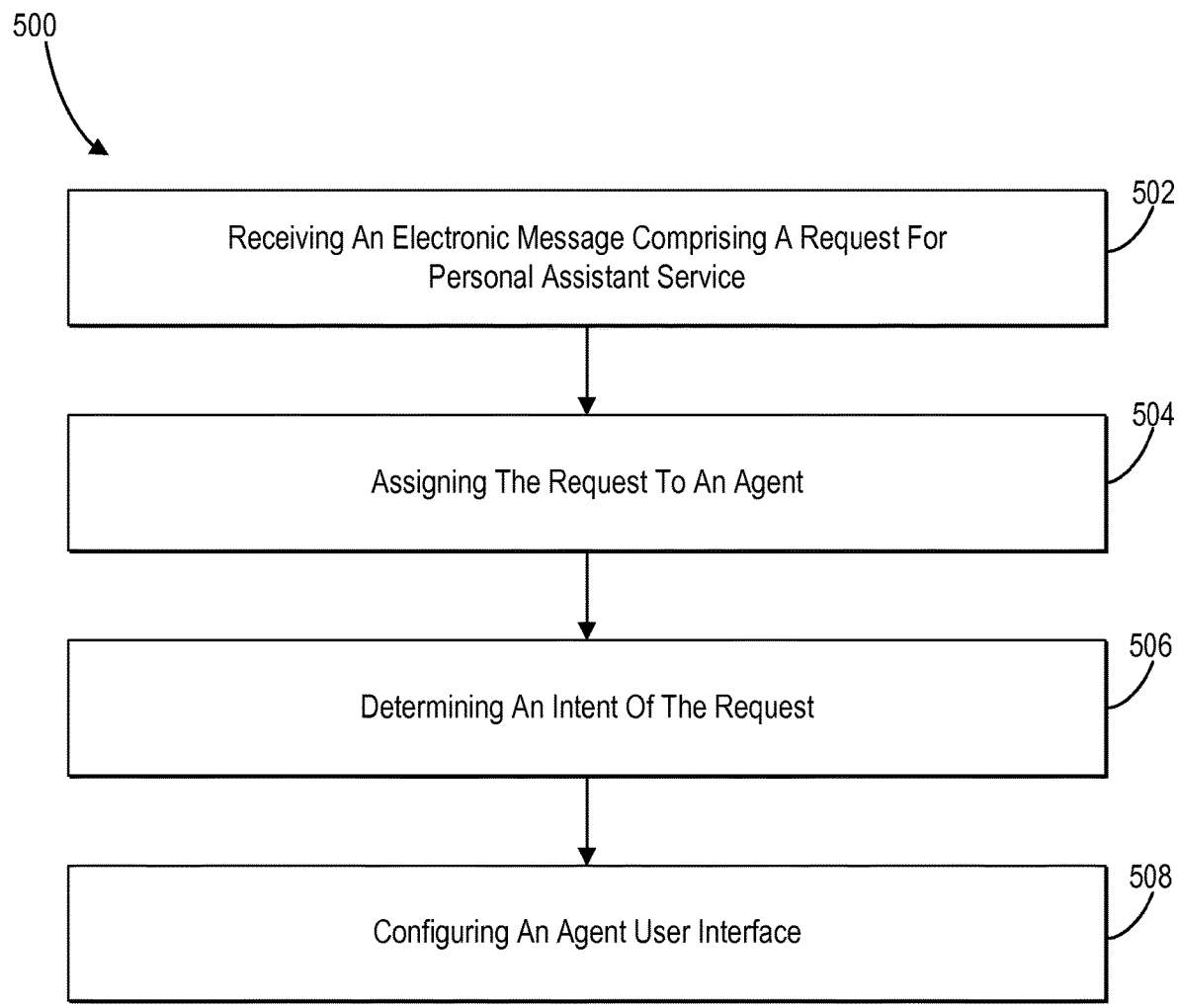
FIG. 5 illustrates a flowchart of an embodiment of a series of acts in a method of providing personal assistant service via messaging in accordance with one or more embodiments.

FIG. 5 illustrates a flowchart of a method 500 of providing personal assistant service via messaging. The method 500 includes an act 502 of receiving an electronic message comprising a request for personal assistant service. For example, act 502 involves receiving, from a user of a messaging application, an electronic message comprising a request for personal assistant service. To illustrate, act 502 can involve receiving an instant message comprising text content indicating a request for personal assistant service to perform one or more actions for the user.

The method 500 also includes an act 504 of assigning the request to an agent. For example, act 504 involves assigning the request to an agent to fulfill the request. To illustrate, act 504 can involve assigning the request to the agent based on a workload of the agent. Alternatively, act 504 can involve assigning the request to the agent based on a location and a language associated with the agent. Alternatively, act 504 can involve receiving a request by an agent to assign the request to the agent, and assigning the request to the agent in response to the received request.

The method 500 further includes an act 506 of determining an intent of the request. For example, act 506 can involve determining, using a natural language processor, an intent of the request. To illustrate, act 506 can involve determining the intent of the request comprises identifying, from the request, one or more words or phrases indicative of the intent. Additionally, act 506 can involve determining the intent of the request based on determined intents for a plurality of previous requests from a plurality of users.

Additionally, the method 500 includes an act 508 of configuring an agent user interface 302, 402. For example, act 508 involves configuring an agent user interface 302, 402 to include one or more options in accordance with the determined intent of the request. To illustrate, act 508 can involve configuring the agent user interface 302, 402 to include one or more options in accordance with the determined intent of the request by providing one or more possible options associated with identified words or phrases in the user interface.

Act 508 can also involve highlighting one or more words or phrases in the electronic message corresponding to the determined intent and one or more details associated with the determined intent. Additionally, act 508 can involve applying a color code to the one or more details for displaying within the user agent interface.

The method 500, as part of act 508 or as an additional act, can include obtaining, based on the determined intent of the request, a listing of options from a third-party service, and providing the listing of options from the third-party service in the agent user interface 302, 402. Furthermore, the method 500 can include an act of providing a plurality of selectable elements corresponding to the listing of options in the agent user interface 302, 402.

As part of act 508, or as an additional act, the method 500 can also include receiving a user input via the agent user interface 302, 402 to modify the intent of the request. The method 500 can additional include an act of reconfiguring the agent user interface 302, 402 to include one or more options in accordance with the modified intent of the request.

As part of act 508, or as an additional act, the method 500 can include an act of determining a plurality of characteristics corresponding to the determined intent of the request. Additionally, the method 500 can include acts of identifying, in the request, one or more request details corresponding to the plurality of characteristics, and populating one or more detail fields associated with the one or more options in the agent user interface 302, 402 with the identified one or more request details.

The method 500 can also include an act of identifying, based on the request, an unpopulated detail field from the one or more detail fields. The method 500 can further include acts of generating an automated response to the request in connection with the unpopulated detail field, and providing the generated response to the agent in a messaging area of the agent user interface 302, 402 for sending to the user of the messaging application. For example, the method 500 can include an act of generating an interactive response to the request in connection with the unpopulated detail field. The interactive response can include a plurality of selectable elements associated with the unpopulated detail field for displaying within a messaging thread 310, 404 of the messaging application. The method 500 can additionally, or alternatively, include an act of generating an interactive message comprising a plurality of selectable options associated with fulfilling the request for personal assistant service, and sending the generated interactive message to the user within a messaging thread 310, 404 of the messaging application.

The method 500 can additionally include an act of maintaining a messaging history of electronic messages associated with the electronic message comprising the request. The method 500 can also include an act of identifying one or more actions by the agent in connection with the request. The method 500 can then include an act of training a machine learning model based on the message history and the identified one or more actions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 6 illustrates a block diagram of exemplary computing device 600 that may be configured to perform one or more of the processes described above. One will appreciate that one or more computing devices such as the computing device 600 may implement the personal assistant service system 100. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 806.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touchscreen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social-networking system. A social-networking system may enable its users (such as persons or organizations) to interact with the system and with each other. As mentioned above, the system 100 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 7:
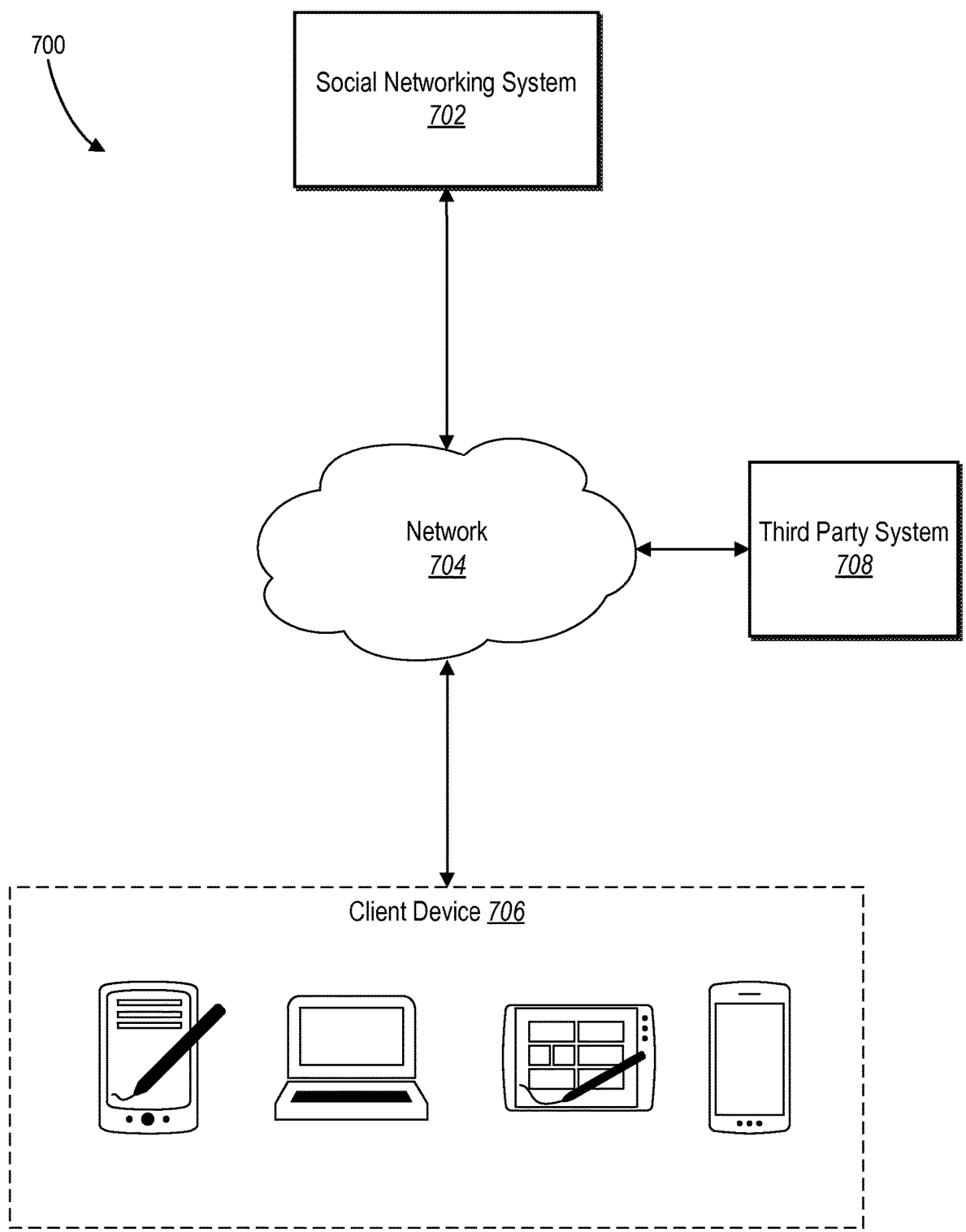
FIG. 7 illustrates an example network environment of a social-networking system in accordance with one or more embodiments.

FIG. 7 illustrates an example network environment 700 of a social-networking system. Network environment 700 includes a client system 706, a social-networking system 702, and a third-party system 708 connected to each other by a network 704. Although FIG. 7 illustrates a particular arrangement of client system 706, social-networking system 702, third-party system 708, and network 704, this disclosure contemplates any suitable arrangement of client system 706, social-networking system 702, third-party system 708, and network 704. As an example and not by way of limitation, two or more of client system 706, social-networking system 702, and third-party system 708 may be connected to each other directly, bypassing network 704. As another example, two or more of client system 706, social-networking system 702, and third-party system 708 may be physically or logically co-located with each other in whole or in part. Moreover, although FIG. 7 illustrates a particular number of client systems 706, social-networking systems 702, third-party systems 708, and networks 704, this disclosure contemplates any suitable number of client systems 706, social-networking systems 702, third-party systems 708, and networks 704. As an example and not by way of limitation, network environment 700 may include multiple client system 706, social-networking systems 702, third-party systems 708, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client system 706, social-networking system 702, and third-party system 708 to communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 706 may be an electronic device including hardware, software, or embedded logic components or a combination of two or more such components and capable of carrying out the appropriate functionalities implemented or supported by client system 706. As an example and not by way of limitation, a client system 706 may include any of the computing devices discussed above in relation to FIG. 6. A client system 706 may enable a network user at client system 706 to access network 704. A client system 706 may enable its user to communicate with other users at other client systems 706.

In particular embodiments, client system 706 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 706 may enter a Uniform Resource Locator (URL) or other address directing the web browser to a particular server (such as server, or a server associated with a third-party system 708), and the web browser may generate a Hyper Text Transfer Protocol (HTTP) request and communicate the HTTP request to server. The server may accept the HTTP request and communicate to client system 706 one or more Hyper Text Markup Language (HTML) files responsive to the HTTP request. Client system 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 702 may be a network-addressable computing system that can host an online social network. Social-networking system 702 may generate, store, receive, and send social-networking data, such as, for example, user-profile data, concept-profile data, social-graph information, or other suitable data related to the online social network. Social-networking system 702 may be accessed by the other components of network environment 700 either directly or via network 704. In particular embodiments, social-networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 706, a social-networking system 702, or a third-party system 708 to manage, retrieve, modify, add, or delete, the information stored in data store.

In particular embodiments, social-networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 702 may provide users of the online social network the ability to communicate and interact with other users. In particular embodiments, users may join the online social network via social-networking system 702 and then add connections (e.g., relationships) to a number of other users of social-networking system 702 whom they want to be connected to. Herein, the term "friend" may refer to any other user of social-networking system 702 with whom a user has formed a connection, association, or relationship via social-networking system 702.

In particular embodiments, social-networking system 702 may provide users with the ability to take actions on various types of items or objects, supported by social-networking system 702. As an example and not by way of limitation, the items and objects may include groups or social networks to which users of social-networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 702 or by an external system of third-party system 708, which is separate from social-networking system 702 and coupled to social-networking system 702 via a network 704.

In particular embodiments, social-networking system 702 may be capable of linking a variety of entities. As an example and not by way of limitation, social-networking system 702 may enable users to interact with each other as well as receive content from third-party systems 708 or other entities, or to allow users to interact with these entities through an application programming interfaces (API) or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating social-networking system 702. In particular embodiments, however, social-networking system 702 and third-party systems 708 may operate in conjunction with each other to provide social-networking services to users of social-networking system 702 or third-party systems 708. In this sense, social-networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client system 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 702 also includes user-generated content objects, which may enhance a user's interactions with social-networking system 702. User-generated content may include anything a user can add, upload, send, or "post" to social-networking system 702. As an example and not by way of limitation, a user communicates posts to social-networking system 702 from a client system 706. Posts may include data such as status updates or other textual data, location information, photos, videos, links, music or other similar data or media. Content may also be added to social-networking system 702 by a third-party through a "communication channel," such as a newsfeed or stream.

In particular embodiments, social-networking system 702 may include a variety of servers, sub-systems, programs, modules, logs, and data stores. In particular embodiments, social-networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 702 may also include suitable components such as network interfaces, security mechanisms, load balancers, failover servers, management-and-network-operations consoles, other suitable components, or any suitable combination thereof. In particular embodiments, social-networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 702 to one or more client systems 706 or one or more third-party system 708 via network 704. The web server may include a mail server or other messaging functionality for receiving and routing messages between social-networking system 702 and one or more client systems 706. An API-request server may allow a third-party system 708 to access information from social-networking system 702 by calling one or more APIs. An action logger may be used to receive communications from a web server about a user's actions on or off social-networking system 702. In conjunction with the action log, a third-party-content-object log may be maintained of user exposures to third-party-content objects. A notification controller may provide information regarding content objects to a client system 706. Information may be pushed to a client system 706 as notifications, or information may be pulled from client system 706 responsive to a request received from client system 706. Authorization servers may be used to enforce one or more privacy settings of the users of social-networking system 702. A privacy setting of a user determines how particular information associated with a user can be shared. The authorization server may allow users to opt in to or opt out of having their actions logged by social-networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client systems 706 associated with users. Advertisement-pricing modules may combine social information, the current time, location information, or other suitable information to provide relevant advertisements, in the form of notifications, to a user.

Figure 8:
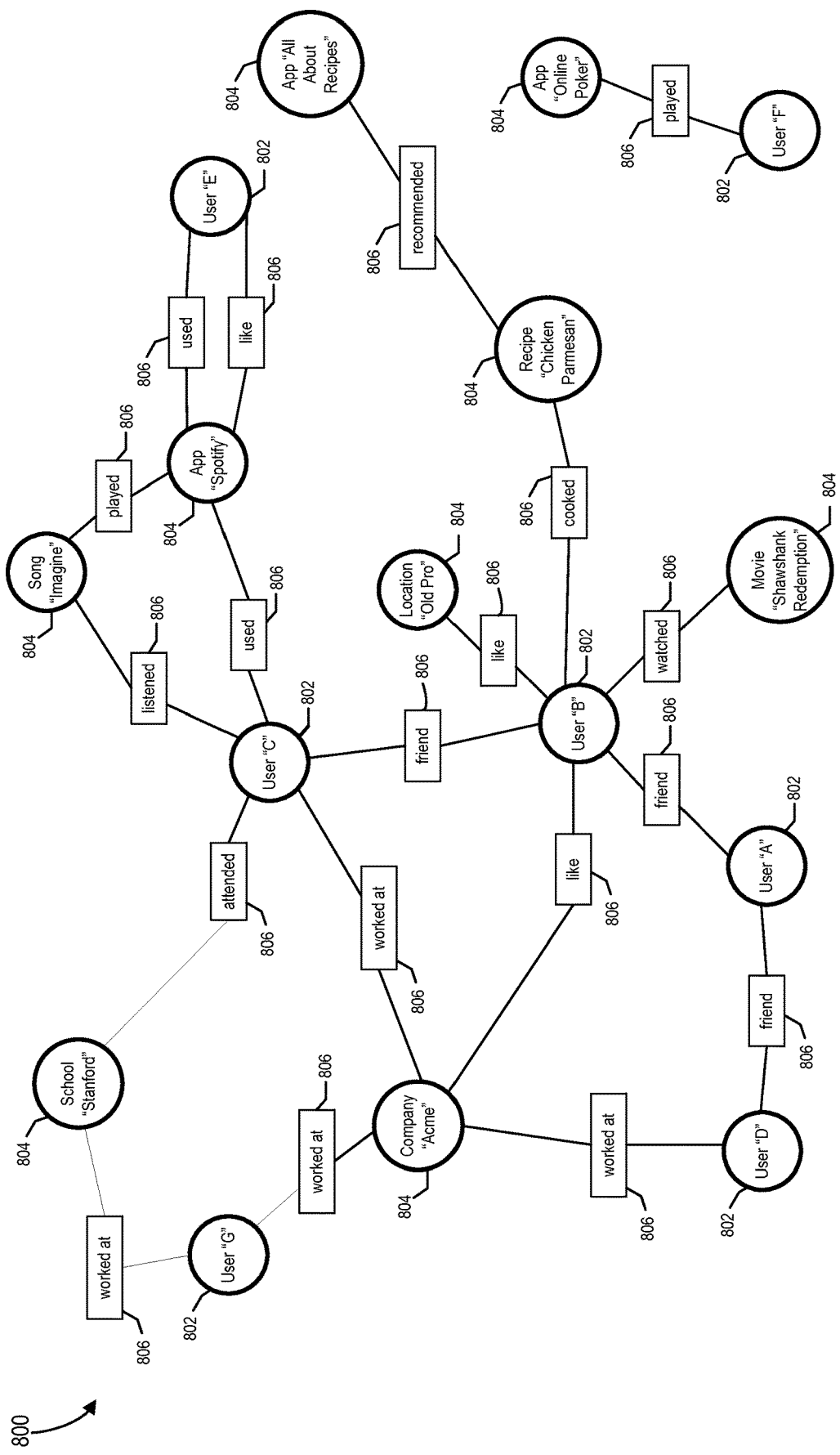
FIG. 8 illustrates an example social graph for a social-networking system in accordance with one or more embodiments.

FIG. 8 illustrates example social graph 800. In particular embodiments, social-networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social-networking system 702, client system 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of social-networking system 702. As an example and not by way of limitation, a user may be an individual (human user), an entity (e.g., an enterprise, business, or third-party application), or a group (e.g., of individuals or entities) that interacts or communicates with or over social-networking system 702. In particular embodiments, when a user registers for an account with social-networking system 702, social-networking system 702 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social-networking system 702. In particular embodiments, a user node 802 may be associated with information provided by a user or information gathered by various systems, including social-networking system 702. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 702 or a third-party website associated with a web-application server); an entity (such as, for example, a person, business, group, sports team, or celebrity); a resource (such as, for example, an audio file, video file, digital photo, text file, structured document, or application) which may be located within social-networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social-networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social-networking system 702. Profile pages may also be hosted on third-party websites associated with a third-party server 708. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 706 to send to social-networking system 702 a message indicating the user's action. In response to the message, social-networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social-networking system 702 may send a "friend request" to the second user. If the second user confirms the "friend request," social-networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to a edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social-networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social-networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social-networking system 702 may create an edge 806 between a user node 802 and a concept node 804 in social graph 800. As an example and not by way of limitation, a user viewing a concept-profile page (such as, for example, by using a web browser or a special-purpose application hosted by the user's client system 706) may indicate that he or she likes the concept represented by the concept node 804 by clicking or selecting a "Like" icon, which may cause the user's client system 706 to send to social-networking system 702 a message indicating the user's liking of the concept associated with the concept-profile page. In response to the message, social-networking system 702 may create an edge 806 between user node 802 associated with the user and concept node 804, as illustrated by "like" edge 806 between the user and concept node 804. In particular embodiments, social-networking system 702 may store an edge 806 in one or more data stores. In particular embodiments, an edge 806 may be automatically formed by social-networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 702) or RSVP (e.g., through social-networking system 702) to an event associated with the advertisement. In addition or as an alternative, an advertisement may include social-networking-system context directed to the user. As an example and not by way of limitation, an advertisement may display information about a friend of the user within social-networking system 702 who has taken an action associated with the subject matter of the advertisement.

In particular embodiments, social-networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 708 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 702 may calculate a coefficient based on a user's actions. Social-networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Social-networking system 702 may analyze a user's actions to determine whether one or more of the actions indicate an affinity for subject matter, content, other users, and so forth. As an example and not by way of limitation, if a user may make frequently posts content related to "coffee" or variants thereof, social-networking system 702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 702 may calculate a coefficient based on the type of relationship between particular objects. Referencing the social graph 800, social-networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 702 may determine that the user has a higher coefficient with respect to the first photo than the second photo because having a tagged-in-type relationship with content may be assigned a higher weight and/or rating than having a like-type relationship with content. In particular embodiments, social-networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 702 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social-networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 706 of the user). A first user may be more interested in other users or concepts that are closer to the first user. As an example and not by way of limitation, if a user is one mile from an airport and two miles from a gas station, social-networking system 702 may determine that the user has a higher coefficient for the airport than the gas station based on the proximity of the airport to the user.

In particular embodiments, social-networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 702 may provide information that is relevant to user's interests and current circumstances, increasing the likelihood that they will find such information of interest. In particular embodiments, social-networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, social-networking system 702 may calculate the coefficient (or access the coefficient information if it has previously been calculated and stored). In particular embodiments, social-networking system 702 may measure an affinity with respect to a particular process. Different processes (both internal and external to the online social network) may request a coefficient for a particular object or set of objects. Social-networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social-networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 702 may send a request to the data store for the object. The request may identify the user associated with the request and may only be sent to the user (or a client system 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   receiving, by one or more servers from a client device of a user of a messaging application, an electronic message comprising a request for personal assistant service;
   assigning, by the one or more servers, the request to an agent to fulfill the request;
   determining, using a natural language processor, an intent of the request; and
   configuring, by the one or more servers, an agent user interface to include one or more options in accordance with the determined intent of the request, wherein configuring the agent user interface comprises:
   presenting, within a first portion of the agent user interface, the received electronic message comprising the request, the first portion comprising a messaging interface displaying one or more electronic messages involving the user and the agent within a messaging thread;
   presenting, within a second portion of the agent user interface separate from the first portion of the agent user interface, information received from a third-party service in response to determining the intent of the request;
   determining a plurality of details associated with fulfilling the request based on the determined intent of the request;
   generating a plurality of modifiable detail elements corresponding to the plurality of details;
   displaying the plurality of modifiable detail elements as an overlay on top of the messaging thread displaying the one or more electronic messages and below a most recent electronic message in the messaging thread;
   determining that a new electronic message is entered into the messaging thread; and
   moving the overlay within the messaging thread below the new electronic message based on the new electronic message being the most recent electronic message in the messaging thread.

2. The method as recited in claim 1, wherein:
   determining the intent of the request comprises identifying, from the request, one or more words or phrases indicative of the intent; and
   configuring the agent user interface to include one or more options in accordance with the determined intent of the request comprises providing the one or more possible options associated with the identified words or phrases in the agent user interface.

3. The method as recited in claim 1, further comprising:
   identifying, based on the request, one or more request details corresponding to the determined intent; and
   populating one or more modifiable detail elements of the plurality of modifiable detail elements with the identified one or more request details.

4. The method as recited in claim 3, further comprising:
   identifying, based on the request, an unpopulated modifiable detail element of the plurality of modifiable detail elements;
   generating an automated response to the request in connection with the unpopulated modifiable detail element; and
   providing the generated response to the agent in the first portion of the agent user interface comprising a messaging area for sending to the user of the messaging application.

5. The method as recited in claim 1, further comprising:
   receiving a user input via the agent user interface to modify the determined intent of the request by modifying an intent element within the agent user interface; and
   reconfiguring the agent user interface to change the plurality of modifiable detail elements in accordance with the modified intent of the request.

6. The method as recited in claim 1, further comprising:
   maintaining a messaging history of electronic messages associated with the electronic message comprising the request;
   identifying one or more actions by the agent in connection with the request; and
   training a machine learning model based on the message history and the identified one or more actions.

7. The method as recited in claim 1, wherein presenting information received from the third-party service comprises:
   obtaining, based on the determined intent of the request, a listing of options from the third-party service; and
   presenting the listing of options from the third-party service as a plurality of selectable elements within the second portion of the agent user interface, the second portion of the agent user interface comprising a browser interface.

8. The method as recited in claim 7, further comprising:
   receiving, via the second portion of the agent user interface, a selection of a selectable element of the plurality of selectable elements;
   generating, in response to the selection, an electronic message comprising information associated with the selectable element of the plurality of selectable elements; and
   presenting, within the first portion of the agent user interface, the electronic message comprising the information associated with the selected option.

9. A system comprising:
   at least one processor; and
   at least one non-transitory computer-readable storage medium storing instructions thereon that, when executed by the at least one processor, cause the system to:
   receive, from a client device of a user of a messaging application, an electronic message comprising a request for personal assistant service;
   assign the request to an agent to fulfill the request;
   determine, using a natural language processor, an intent of the request; and configure an agent user interface to include one or more options in accordance with the determined intent of the request, wherein configuring the agent user interface comprises:
presenting, within a first portion of the agent user interface, the received electronic message comprising the request, the first portion comprising a messaging interface displaying one or more electronic messages involving the user and the agent within a messaging thread;
presenting, within a second portion of the agent user interface separate from the first portion of the agent user interface, information received from a third-party service in response to determining the intent of the request;
determining a plurality of details associated with fulfilling the request based on the determined intent of the request;
generating a plurality of modifiable detail elements corresponding to the plurality of details;
displaying the plurality of modifiable detail elements as an overlay on top of the messaging thread displaying the one or more electronic messages and below a most recent electronic message in the messaging thread;
determining that a new electronic message is entered into the messaging thread; and
moving the overlay within the messaging thread below the new electronic message based on the new electronic message being the most recent electronic message in the messaging thread.

10. The system as recited in claim 9, wherein determining the intent of the request comprises identifying, from the request, one or more words or phrases indicative of the intent.

11. The system as recited in claim 9, further comprising instructions that, when executed by the at least one processor, cause the system to:
identify, based on the request, one or more request details corresponding to the determined intent; and
populate one or more modifiable detail elements of the plurality of modifiable detail elements with the identified one or more request details.

12. The system as recited in claim 11, further comprising instructions that, when executed by the at least one processor, cause the system to:
identify, based on the request, an unpopulated modifiable detail element of the plurality of the plurality of modifiable detail elements;
generate an automated response to the request in connection with the unpopulated modifiable detail element; and
provide the generated response to the agent in the first portion of the agent user interface comprising a messaging area for sending to the user of the messaging application.

13. The system as recited in claim 9, further comprising instructions that, when executed by the at least one processor, cause the system to:
receive a user input via the agent user interface to modify the determined intent of the request by modifying an intent element within the user interface; and
reconfigure the agent user interface to change the plurality of modifiable detail elements in accordance with the modified intent of the request.

14. The system as recited in claim 9, further comprising instructions that, when executed by the at least one processor, cause the system to:
maintain a messaging history of electronic messages associated with the electronic message comprising the request;
identify one or more actions by the agent in connection with the request; and
train a machine learning model based on the message history and the identified one or more actions.

15. The system as recited in claim 9, further comprising instructions that, when executed by the at least one processor, cause the system to:
obtain, based on the determined intent of the request, a listing of options from the third-party service;
present the listing of options from the third-party service as a plurality of selectable elements within the second portion of the agent user interface;
receive, via the second portion of the agent user interface, a user input to select a selectable element of the plurality of selectable elements;
generate, in response to the selected selectable element, an electronic message comprising information associated with the selectable element of the plurality of selectable elements; and
present, within the first portion of the agent user interface, the electronic message comprising the information associated with the selected option.

16. A non-transitory computer readable medium storing instructions thereon that, when executed by at least one processor, cause a computer system to:
receive, from a client device of a user of a messaging application, an electronic message comprising a request for personal assistant service;
assign the request to an agent to fulfill the request;
determine, using a natural language processor, an intent of the request; and
configure an agent user interface to include one or more options in accordance with the determined intent of the request, wherein configuring the agent user interface comprises:
presenting, within a first portion of the agent user interface, the received electronic message comprising the request, the first portion comprising a messaging interface displaying one or more electronic messages involving the user and the agent within a messaging thread;
presenting, within a second portion of the agent user interface separate from the first portion of the agent user interface, information received from a third-party service in response to determining the intent of the request;
determining a plurality of details associated with fulfilling the request based on the determined intent of the request;
generating a plurality of modifiable detail elements corresponding to the plurality of details;
displaying the plurality of modifiable detail elements as an overlay on top of the messaging thread displaying the one or more electronic messages and below a most recent electronic message in the messaging thread;
determining that a new electronic message is entered into the messaging thread; and
moving the overlay within the messaging thread below the new electronic message based on the new electronic message being the most recent electronic message in the messaging thread.

17. The non-transitory computer readable medium as recited in claim 16, wherein:

determining the intent of the request comprises identifying, from the request, one or more words or phrases indicative of the intent; and configuring the agent user interface to include one or more options in accordance with the determined intent of the request comprises providing the one or more possible options associated with the identified words or phrases in the agent user interface.

18. The non-transitory computer readable medium as recited in claim 16, further comprising instructions that, when executed by the at least one processor, cause the computer system to:

identify, based on the request, one or more request details corresponding to the determined intent; and populate one or more modifiable detail elements of the plurality of modifiable detail elements with the identified one or more request details.

19. The non-transitory computer readable medium as recited in claim 18, further comprising instructions that, when executed by the at least one processor, cause the computer system to:

identify, based on the request, an unpopulated modifiable detail element of the plurality of modifiable detail elements;

generate an automated response to the request in connection with the unpopulated modifiable detail element; and provide the generated response to the agent in the first portion of the agent user interface comprising a messaging area for sending to the user of the messaging application.

20. The non-transitory computer readable medium as recited in claim 16, further comprising instructions that, when executed by the at least one processor, cause the computer system to:

obtain, based on the determined intent of the request, a listing of options from the third-party service;

present the listing of options from the third-party service as a plurality of selectable elements within the second portion of the agent user interface;

receive, via the second portion of the agent user interface, a user input to select a selectable element of the plurality of selectable elements;

generate, in response to the selected selectable element, an electronic message comprising information associated with the selectable element of the plurality of selectable elements; and present, within the first portion of the agent user interface, the electronic message comprising the information associated with the selected option.

* * * * *